(12) United States Patent
Sripada

(10) Patent No.: US 10,776,561 B2
(45) Date of Patent: Sep. 15, 2020

(54) METHOD AND APPARATUS FOR GENERATING A LINGUISTIC REPRESENTATION OF RAW INPUT DATA

(71) Applicant: ARRIA DATA2TEXT LIMITED, Aberdeen (GB)

(72) Inventor: Gowri Somayajulu Sripada, Westhill (GB)

(73) Assignee: Arria Data2Text Limited, Aberdeen (GB)

( * ) Notice: Subject to any disclaimer, the term of this patent is extended or adjusted under 35 U.S.C. 154(b) by 146 days.

(21) Appl. No.: 14/760,848

(22) PCT Filed: Jan. 15, 2013

(86) PCT No.: PCT/IB2013/050375
§ 371 (c)(1),
(2) Date: Jul. 14, 2015

(87) PCT Pub. No.: WO2014/111753
PCT Pub. Date: Jul. 24, 2014

(65) Prior Publication Data
US 2015/0363364 A1    Dec. 17, 2015

(51) Int. Cl.
*H04N 21/4728* (2011.01)
*H04N 21/472* (2011.01)
(Continued)

(52) U.S. Cl.
CPC ......... *G06F 40/103* (2020.01); *G06F 16/95* (2019.01); *G06F 40/106* (2020.01); *G06F 40/40* (2020.01); *G06F 16/211* (2019.01); *G06F 16/258* (2019.01)

(58) Field of Classification Search
USPC ....................................................... 715/243
See application file for complete search history.

(56) References Cited

U.S. PATENT DOCUMENTS 5,181,250 A    1/1993   Morgan et al.
5,237,502 A    8/1993   White et al.
(Continued)

FOREIGN PATENT DOCUMENTS

AU    2011247830 B2    12/2011
AU    2011253627 B2    12/2011
(Continued)

OTHER PUBLICATIONS

Kukich, K., *Knowledge-Based Report Generation: A Knowledge-Engineering Approach to Natural Language Report Generation*, Dissertation to the Interdisciplinary Department of Information Science, University of Pittsburg (Aug. 1983) 260 pages.
(Continued)

*Primary Examiner* — Cesar B Paula
*Assistant Examiner* — Luu-Phuong T Nguyen
(74) *Attorney, Agent, or Firm* — Alston & Bird LLP

(57) ABSTRACT

Methods, apparatuses, and computer program products are described herein that are configured to be embodied as and/or performed by a document planner. In some example embodiments, a method is provided that comprises selecting a schema based on one or more messages available in a message store and using the selected schema and one or more messages available in the message store to generate a document plan. The schema of this embodiment may be defined by a specification containing one or more queries for selecting one or more messages, one or more messages, and/or one or more predefined phrases to instantiate a document plan. The method of this embodiment may also include applying an optimization specification to the document plan to generate an optimized document plan.

20 Claims, 10 Drawing Sheets

(51) Int. Cl.
*G06F 40/103* (2020.01)
*G06F 16/95* (2019.01)
*G06F 40/40* (2020.01)
*G06F 40/106* (2020.01)
G06F 16/21 (2019.01)
G06F 16/25 (2019.01)

(56) References Cited

U.S. PATENT DOCUMENTS

| | | | |
|---|---|---|---|
| 5,311,429 A | 5/1994 | Tominaga | |
| 5,321,608 A | 6/1994 | Namba et al. | |
| 5,629,687 A | 5/1997 | Sutton et al. | |
| 5,794,177 A | 8/1998 | Carus et al. | |
| 5,802,488 A | 9/1998 | Edatsune | |
| 6,023,669 A | 2/2000 | Suda et al. | |
| 6,078,914 A | 6/2000 | Redfern | |
| 6,138,087 A | 10/2000 | Budzinski | |
| 6,266,617 B1 | 7/2001 | Evans | |
| 6,442,485 B2 | 8/2002 | Evans | |
| 6,466,899 B1 | 10/2002 | Yano et al. | |
| 6,629,340 B1 | 10/2003 | Dale et al. | |
| 6,665,640 B1 | 12/2003 | Bennett et al. | |
| 6,717,513 B1 | 4/2004 | Sandelman et al. | |
| 6,947,885 B2 | 9/2005 | Bangalore et al. | |
| 6,958,746 B1 | 10/2005 | Anderson et al. | |
| 7,043,420 B2 | 5/2006 | Ratnaparkhi | |
| 7,062,483 B2 | 6/2006 | Ferrari et al. | |
| 7,111,018 B1 | 9/2006 | Goodrich et al. | |
| 7,167,824 B2 | 1/2007 | Kallulli | |
| 7,231,341 B2 | 6/2007 | Bangalore et al. | |
| 7,238,313 B2 | 7/2007 | Ferencz et al. | |
| 7,305,336 B2 | 12/2007 | Polanyi et al. | |
| 7,310,969 B2 | 12/2007 | Dale | |
| 7,346,493 B2 | 3/2008 | Ringger et al. | |
| 7,418,447 B2 | 8/2008 | Caldwell et al. | |
| 7,424,363 B2 | 9/2008 | Cheng et al. | |
| 7,444,287 B2 | 10/2008 | Claudatos et al. | |
| 7,493,253 B1 | 2/2009 | Ceusters | |
| 7,493,311 B1 * | 2/2009 | Cutsinger ........... G06F 16/2471 | |
| 7,496,621 B2 | 2/2009 | Pan et al. | |
| 7,526,424 B2 | 4/2009 | Corston-Oliver et al. | |
| 7,533,089 B2 | 5/2009 | Pan et al. | |
| 7,562,005 B1 | 7/2009 | Bangalore et al. | |
| 7,653,545 B1 | 1/2010 | Starkie | |
| 7,657,424 B2 | 2/2010 | Bennett | |
| 7,684,991 B2 | 3/2010 | Stohr et al. | |
| 7,711,581 B2 | 5/2010 | Hood et al. | |
| 7,783,486 B2 | 8/2010 | Rosser et al. | |
| 7,809,552 B2 | 10/2010 | Pan et al. | |
| 7,849,048 B2 | 12/2010 | Langseth et al. | |
| 7,849,049 B2 | 12/2010 | Langseth et al. | |
| 7,856,390 B2 | 12/2010 | Schiller | |
| 7,873,509 B1 | 1/2011 | Budzinski | |
| 7,921,091 B2 | 4/2011 | Cox et al. | |
| 7,930,169 B2 | 4/2011 | Billerey-Mosier | |
| 7,933,774 B1 | 4/2011 | Begeja et al. | |
| 7,966,172 B2 | 6/2011 | Ruiz et al. | |
| 7,966,369 B1 | 6/2011 | Briere et al. | |
| 7,970,601 B2 | 6/2011 | Burmester et al. | |
| 7,979,267 B2 | 7/2011 | Ruiz et al. | |
| 8,015,006 B2 | 9/2011 | Kennewick et al. | |
| 8,019,610 B2 | 9/2011 | Walker et al. | |
| 8,024,331 B2 | 9/2011 | Calistri-Yeh et al. | |
| 8,037,000 B2 | 10/2011 | Delmonico et al. | |
| 8,082,144 B1 | 12/2011 | Brown et al. | |
| 8,090,727 B2 | 1/2012 | Lachtarnik et al. | |
| 8,117,261 B2 | 2/2012 | Briere et al. | |
| 8,150,676 B1 | 4/2012 | Kaeser | |
| 8,175,873 B2 | 5/2012 | Di Fabbrizio et al. | |
| 8,180,647 B2 | 5/2012 | Walker et al. | |
| 8,180,758 B1 | 5/2012 | Cornali | |
| 8,204,751 B1 | 6/2012 | Di Fabbrizio et al. | |
| 8,229,937 B2 | 7/2012 | Kiefer et al. | |
| 8,355,903 B1 | 1/2013 | Birnbaum et al. | |
| 8,374,848 B1 | 2/2013 | Birnbaum et al. | |
| 8,425,325 B2 | 4/2013 | Hope | |
| 8,457,950 B1 | 6/2013 | Gardner | |
| 8,473,911 B1 | 6/2013 | Baxter | |
| 8,494,944 B2 | 7/2013 | Schiller | |
| 8,515,733 B2 | 8/2013 | Jansen | |
| 8,515,737 B2 | 8/2013 | Allen | |
| 8,521,512 B2 | 8/2013 | Gorman et al. | |
| 8,548,814 B2 | 10/2013 | Manuel-Devadoss | |
| 8,548,915 B2 | 10/2013 | Antebi et al. | |
| 8,561,014 B2 | 10/2013 | Mengusoglu et al. | |
| 8,566,090 B2 | 10/2013 | Di Fabbrizio et al. | |
| 8,572,173 B2 | 10/2013 | Briere et al. | |
| 8,589,148 B2 | 11/2013 | Atallah et al. | |
| 8,589,172 B2 | 11/2013 | Alonso et al. | |
| 8,616,896 B2 | 12/2013 | Lennox | |
| 8,620,669 B2 | 12/2013 | Walker et al. | |
| 8,626,613 B2 | 1/2014 | Dale et al. | |
| 8,630,844 B1 | 1/2014 | Nichols et al. | |
| 8,655,889 B2 | 2/2014 | Hua et al. | |
| 8,660,545 B1 | 2/2014 | Redford et al. | |
| 8,676,691 B2 | 3/2014 | Schiller | |
| 8,688,434 B1 | 4/2014 | Birnbaum et al. | |
| 8,689,176 B2 | 4/2014 | Bagheri et al. | |
| 8,700,396 B1 | 4/2014 | Mengibar et al. | |
| 8,711,732 B2 | 4/2014 | Johnson | |
| 8,719,696 B2 * | 5/2014 | Duncan ................. | G06F 17/218 715/236 |
| 8,738,384 B1 | 5/2014 | Bansal et al. | |
| 8,738,558 B2 | 5/2014 | Antebi et al. | |
| 8,762,134 B2 | 5/2014 | Reiter | |
| 8,762,133 B2 | 6/2014 | Reiter | |
| 8,775,161 B1 | 7/2014 | Nichols et al. | |
| 8,825,533 B2 | 9/2014 | Basson et al. | |
| 8,843,363 B2 | 9/2014 | Birnbaum et al. | |
| 8,849,670 B2 | 9/2014 | Di Cristo et al. | |
| 8,886,520 B1 | 11/2014 | Nichols et al. | |
| 8,892,417 B1 | 11/2014 | Nichols et al. | |
| 8,892,419 B2 | 11/2014 | Lundberg et al. | |
| 8,898,063 B1 | 11/2014 | Sykes et al. | |
| 8,903,711 B2 | 12/2014 | Lundberg et al. | |
| 8,903,718 B2 | 12/2014 | Akuwudike | |
| 8,909,595 B2 | 12/2014 | Gandy et al. | |
| 8,914,452 B2 | 12/2014 | Boston et al. | |
| 8,924,330 B2 | 12/2014 | Antebi et al. | |
| 8,930,178 B2 | 1/2015 | Pestian et al. | |
| 8,930,305 B2 | 1/2015 | Namburu et al. | |
| 8,935,769 B2 | 1/2015 | Hessler | |
| 8,977,953 B1 | 3/2015 | Pierre et al. | |
| 8,984,051 B2 | 3/2015 | Olsen et al. | |
| 9,002,695 B2 | 4/2015 | Watanabe et al. | |
| 9,002,869 B2 | 4/2015 | Riezler et al. | |
| 9,015,730 B1 | 4/2015 | Allen et al. | |
| 9,028,260 B2 | 5/2015 | Nanjiani et al. | |
| 9,092,276 B2 | 7/2015 | Allen et al. | |
| 9,104,720 B2 | 8/2015 | Rakshit et al. | |
| 9,110,882 B2 | 8/2015 | Overell et al. | |
| 9,110,977 B1 | 8/2015 | Pierre et al. | |
| 9,111,534 B1 | 8/2015 | Sylvester et al. | |
| 9,135,244 B2 | 9/2015 | Reiter | |
| 9,135,662 B2 | 9/2015 | Evenhouse et al. | |
| 9,146,904 B2 | 9/2015 | Allen | |
| 9,164,982 B1 | 10/2015 | Kaeser | |
| 9,173,005 B1 | 10/2015 | Redford et al. | |
| 9,190,054 B1 | 11/2015 | Riley et al. | |
| 9,208,147 B1 | 12/2015 | Nichols et al. | |
| 9,229,927 B2 | 1/2016 | Wolfram et al. | |
| 9,240,197 B2 | 1/2016 | Begeja et al. | |
| 9,244,894 B1 | 1/2016 | Dale et al. | |
| 9,251,134 B2 | 2/2016 | Birnbaum et al. | |
| 9,251,143 B2 | 2/2016 | Bird et al. | |
| 9,263,039 B2 | 2/2016 | Di Cristo et al. | |
| 9,268,770 B1 | 2/2016 | Kursun | |
| 9,323,743 B2 | 4/2016 | Reiter | |
| 9,396,181 B1 | 7/2016 | Sripada et al. | |
| 9,405,448 B2 | 8/2016 | Reiter | |
| 9,640,045 B2 | 5/2017 | Reiter | |
| 9,904,676 B2 | 2/2018 | Sripada et al. | |
| 10,026,274 B2 | 7/2018 | Reiter | |
| 2002/0026306 A1 | 2/2002 | Bangalore et al. | |

(56) References Cited

U.S. PATENT DOCUMENTS

| | | |
|---|---|---|
| 2002/0143742 A1* | 10/2002 | Nonomura ........ G06F 17/30923 |
| 2002/0147711 A1* | 10/2002 | Hattori ................ G06F 16/8373 |
| 2003/0131315 A1 | 7/2003 | Escher |
| 2003/0182102 A1 | 9/2003 | Corston-Oliver et al. |
| 2003/0195740 A1 | 10/2003 | Tokuda et al. |
| 2003/0212545 A1 | 11/2003 | Kalulli |
| 2003/0233230 A1 | 12/2003 | Ammicht et al. |
| 2004/0002958 A1* | 1/2004 | Seshadri ............. H04L 12/1859 |
| 2004/0044515 A1 | 3/2004 | Metcalf et al. |
| 2004/0093344 A1* | 5/2004 | Berger .................... G06F 16/25 |
| 2004/0246120 A1 | 12/2004 | Benner et al. |
| 2004/0268237 A1* | 12/2004 | Jones .................... G06F 40/117 715/205 |
| 2005/0039107 A1 | 2/2005 | Hander et al. |
| 2005/0108001 A1 | 5/2005 | Aarskog |
| 2005/0228635 A1 | 10/2005 | Araki et al. |
| 2005/0256703 A1 | 11/2005 | Markel |
| 2006/0004725 A1* | 1/2006 | Abraido-Fandino ........................ G06F 16/951 |
| 2006/0004844 A1* | 1/2006 | Rothschiller ........... G06F 40/14 |
| 2006/0020886 A1 | 1/2006 | Agrawal et al. |
| 2006/0020916 A1 | 1/2006 | Allison et al. |
| 2006/0085414 A1 | 4/2006 | Chai et al. |
| 2006/0085667 A1 | 4/2006 | Kubota et al. |
| 2006/0136196 A1 | 6/2006 | Brun et al. |
| 2006/0178868 A1 | 8/2006 | Billerey-Mosier |
| 2006/0184888 A1* | 8/2006 | Bala ........................ G06F 9/453 715/762 |
| 2006/0224638 A1 | 10/2006 | Wald et al. |
| 2006/0242563 A1* | 10/2006 | Liu ....................... G06F 17/227 715/234 |
| 2006/0259293 A1 | 11/2006 | Orwant |
| 2007/0038643 A1 | 2/2007 | Epstein |
| 2007/0078655 A1 | 4/2007 | Semkow et al. |
| 2007/0106628 A1 | 5/2007 | Adjali et al. |
| 2007/0129942 A1 | 6/2007 | Ban et al. |
| 2007/0143099 A1 | 6/2007 | Balchandran et al. |
| 2007/0143278 A1 | 6/2007 | Srivastava et al. |
| 2007/0150806 A1 | 6/2007 | Hartmann |
| 2007/0156677 A1 | 7/2007 | Szabo |
| 2007/0169021 A1 | 7/2007 | Huynh et al. |
| 2007/0219773 A1 | 9/2007 | Roux et al. |
| 2008/0005005 A1 | 1/2008 | Billieux |
| 2008/0221865 A1 | 9/2008 | Wellmann |
| 2008/0221870 A1 | 9/2008 | Attardi et al. |
| 2008/0281781 A1 | 11/2008 | Zhao et al. |
| 2008/0312954 A1 | 12/2008 | Ullrich et al. |
| 2009/0076799 A1 | 3/2009 | Crouch et al. |
| 2009/0089100 A1 | 4/2009 | Nenov et al. |
| 2009/0089126 A1 | 4/2009 | Odubiyi |
| 2009/0111486 A1 | 4/2009 | Burstrom |
| 2009/0138258 A1 | 5/2009 | Neale |
| 2009/0144609 A1 | 6/2009 | Liang et al. |
| 2009/0156229 A1 | 6/2009 | Hein et al. |
| 2009/0177929 A1 | 7/2009 | Sijelmassi |
| 2009/0182549 A1 | 7/2009 | Anisimovich et al. |
| 2009/0198496 A1 | 8/2009 | Denecke |
| 2009/0281839 A1 | 11/2009 | Lynn et al. |
| 2009/0286514 A1 | 11/2009 | Lichorowic et al. |
| 2009/0287567 A1 | 11/2009 | Penberthy et al. |
| 2010/0010802 A1 | 1/2010 | Ruano et al. |
| 2010/0146491 A1 | 6/2010 | Hirano et al. |
| 2010/0153095 A1 | 6/2010 | Yang et al. |
| 2010/0153105 A1 | 6/2010 | Di Fabbrizio et al. |
| 2010/0174545 A1 | 7/2010 | Otani |
| 2010/0191658 A1 | 7/2010 | Kannan et al. |
| 2010/0203970 A1 | 8/2010 | Hope |
| 2010/0210379 A1 | 8/2010 | Shelley |
| 2010/0241421 A1 | 9/2010 | Funakoshi |
| 2010/0325608 A1 | 12/2010 | Radigan |
| 2010/0332235 A1 | 12/2010 | David |
| 2011/0010164 A1 | 1/2011 | Williams |
| 2011/0035210 A1 | 2/2011 | Rosenfeld et al. |
| 2011/0055687 A1* | 3/2011 | Bhandar ............... G06F 17/211 715/235 |
| 2011/0068929 A1 | 3/2011 | Franz et al. |
| 2011/0087486 A1 | 4/2011 | Schiller |
| 2011/0160986 A1 | 6/2011 | Wu et al. |
| 2011/0179006 A1 | 7/2011 | Cox et al. |
| 2011/0184959 A1 | 7/2011 | Maxwell, III et al. |
| 2011/0218822 A1 | 9/2011 | Buisman et al. |
| 2011/0225185 A1 | 9/2011 | Gupta |
| 2011/0257839 A1 | 10/2011 | Mukherjee |
| 2011/0307435 A1 | 12/2011 | Overell et al. |
| 2011/0313757 A1 | 12/2011 | Hoover et al. |
| 2011/0314060 A1 | 12/2011 | Sinha et al. |
| 2012/0078888 A1 | 3/2012 | Brown et al. |
| 2012/0084027 A1 | 4/2012 | Caine |
| 2012/0131008 A1 | 5/2012 | Ahn et al. |
| 2012/0136649 A1 | 5/2012 | Freising et al. |
| 2012/0158089 A1 | 6/2012 | Bocek et al. |
| 2012/0173475 A1 | 7/2012 | Ash et al. |
| 2012/0174018 A1 | 7/2012 | Ash et al. |
| 2012/0232919 A1 | 9/2012 | Wilson et al. |
| 2012/0290289 A1 | 11/2012 | Manera et al. |
| 2012/0290310 A1 | 11/2012 | Watson |
| 2012/0310990 A1* | 12/2012 | Viegas ............... G06F 17/30058 707/794 |
| 2013/0013290 A1 | 1/2013 | Funakoshi et al. |
| 2013/0030810 A1 | 1/2013 | Kopparapu et al. |
| 2013/0041921 A1 | 2/2013 | Cooper et al. |
| 2013/0066873 A1* | 3/2013 | Salvetti ............. G06Q 30/0278 707/738 |
| 2013/0095864 A1* | 4/2013 | Marovets ................ H04W 4/14 455/466 |
| 2013/0138428 A1 | 5/2013 | Chandramouli et al. |
| 2013/0144606 A1 | 6/2013 | Birnbaum et al. |
| 2013/0145242 A1 | 6/2013 | Birnbaum et al. |
| 2013/0151238 A1 | 6/2013 | Beaurpere et al. |
| 2013/0174026 A1 | 7/2013 | Locke |
| 2013/0185050 A1 | 7/2013 | Bird et al. |
| 2013/0185056 A1 | 7/2013 | Ingram et al. |
| 2013/0205195 A1* | 8/2013 | Dekhil .................. G06Q 10/10 715/234 |
| 2013/0211855 A1 | 8/2013 | Eberle et al. |
| 2013/0238329 A1 | 9/2013 | Casella dos Santos |
| 2013/0238330 A1 | 9/2013 | Casella dos Santos |
| 2013/0238987 A1 | 9/2013 | Lutwyche |
| 2013/0251233 A1 | 9/2013 | Yang et al. |
| 2013/0268263 A1 | 10/2013 | Park et al. |
| 2013/0293363 A1 | 11/2013 | Plymouth et al. |
| 2013/0311201 A1 | 11/2013 | Chatfield et al. |
| 2014/0019531 A1 | 1/2014 | Czajka et al. |
| 2014/0025371 A1 | 1/2014 | Min |
| 2014/0039878 A1 | 2/2014 | Wasson |
| 2014/0052696 A1 | 2/2014 | Soroushian |
| 2014/0062712 A1 | 3/2014 | Reiter |
| 2014/0067377 A1 | 3/2014 | Reiter |
| 2014/0072947 A1 | 3/2014 | Boguraev et al. |
| 2014/0072948 A1 | 3/2014 | Boguraev et al. |
| 2014/0089212 A1 | 3/2014 | Sbodio |
| 2014/0100846 A1 | 4/2014 | Haine et al. |
| 2014/0100901 A1 | 4/2014 | Haine et al. |
| 2014/0100923 A1 | 4/2014 | Strezo et al. |
| 2014/0143720 A1 | 5/2014 | Dimarco et al. |
| 2014/0149107 A1 | 5/2014 | Schilder |
| 2014/0164303 A1 | 6/2014 | Bagchi et al. |
| 2014/0164304 A1 | 6/2014 | Bagchi et al. |
| 2014/0188477 A1 | 7/2014 | Zhang |
| 2014/0278358 A1 | 9/2014 | Byron et al. |
| 2014/0281935 A1 | 9/2014 | Byron et al. |
| 2014/0281951 A1 | 9/2014 | Megiddo et al. |
| 2014/0297268 A1 | 10/2014 | Govrin et al. |
| 2014/0316768 A1 | 10/2014 | Khandekar |
| 2014/0328570 A1 | 11/2014 | Cheng et al. |
| 2014/0358964 A1 | 12/2014 | Woods et al. |
| 2014/0375466 A1 | 12/2014 | Reiter |
| 2014/0379322 A1 | 12/2014 | Koutrika et al. |
| 2014/0379378 A1 | 12/2014 | Cohen-Solal et al. |
| 2015/0006437 A1 | 1/2015 | Byron et al. |
| 2015/0032443 A1 | 1/2015 | Karov et al. |
| 2015/0081299 A1 | 3/2015 | Jasinschi et al. |

(56) References Cited

U.S. PATENT DOCUMENTS

| | | |
|---|---|---|
| 2015/0081307 A1 | 3/2015 | Cederstrom et al. |
| 2015/0081321 A1 | 3/2015 | Jain |
| 2015/0095015 A1 | 4/2015 | Lani et al. |
| 2015/0106307 A1 | 4/2015 | Antebi et al. |
| 2015/0142418 A1 | 5/2015 | Byron et al. |
| 2015/0142421 A1 | 5/2015 | Buurman et al. |
| 2015/0154359 A1 | 6/2015 | Harris et al. |
| 2015/0163358 A1 | 6/2015 | Klemm et al. |
| 2015/0169522 A1 | 6/2015 | Logan et al. |
| 2015/0169548 A1 | 6/2015 | Reiter |
| 2015/0169659 A1 | 6/2015 | Lee et al. |
| 2015/0169720 A1 | 6/2015 | Byron et al. |
| 2015/0169737 A1 | 6/2015 | Bryon et al. |
| 2015/0179082 A1 | 6/2015 | Byron et al. |
| 2015/0227508 A1 | 8/2015 | Howald et al. |
| 2015/0242384 A1 | 8/2015 | Reiter |
| 2015/0261744 A1 | 9/2015 | Suenbuel et al. |
| 2015/0261836 A1 | 9/2015 | Madhani et al. |
| 2015/0279348 A1 | 10/2015 | Cao et al. |
| 2015/0310013 A1 | 10/2015 | Allen et al. |
| 2015/0310112 A1 | 10/2015 | Allen et al. |
| 2015/0310861 A1 | 10/2015 | Waltermann et al. |
| 2015/0324343 A1 | 11/2015 | Carter et al. |
| 2015/0324347 A1 | 11/2015 | Bradshaw et al. |
| 2015/0324351 A1 | 11/2015 | Sripada et al. |
| 2015/0324374 A1 | 11/2015 | Sripada et al. |
| 2015/0324413 A1 | 11/2015 | Gubin et al. |
| 2015/0325000 A1 | 11/2015 | Sripada |
| 2015/0326622 A1 | 11/2015 | Carter et al. |
| 2015/0331845 A1 | 11/2015 | Guggilla et al. |
| 2015/0331846 A1 | 11/2015 | Guggilla et al. |
| 2015/0332670 A1 | 11/2015 | Akbacak et al. |
| 2015/0347400 A1 | 12/2015 | Sripada |
| 2015/0356127 A1 | 12/2015 | Pierre et al. |
| 2015/0363363 A1 | 12/2015 | Bohra et al. |
| 2015/0363382 A1 | 12/2015 | Bohra et al. |
| 2015/0363390 A1 | 12/2015 | Mungi et al. |
| 2015/0363391 A1 | 12/2015 | Mungi et al. |
| 2015/0371651 A1 | 12/2015 | Aharoni et al. |
| 2016/0019200 A1 | 1/2016 | Allen |
| 2016/0027125 A1 | 1/2016 | Bryce |
| 2016/0055150 A1 | 2/2016 | Bird et al. |
| 2016/0132489 A1 | 5/2016 | Reiter |
| 2016/0140090 A1 | 5/2016 | Dale et al. |
| 2016/0232152 A1 | 8/2016 | Mahamood |
| 2016/0328381 A1 | 11/2016 | Reiter |
| 2016/0328385 A1 | 11/2016 | Reiter |
| 2017/0018107 A1 | 1/2017 | Reiter |
| 2017/0075884 A1 | 3/2017 | Sripada et al. |
| 2019/0035232 A1 | 1/2019 | Reiter |

FOREIGN PATENT DOCUMENTS

| | | |
|---|---|---|
| AU | 2013201755 A1 | 9/2013 |
| AU | 2013338351 A1 | 5/2015 |
| CA | 2577721 C | 3/2006 |
| CA | 2826116 C | 3/2006 |
| CN | 103999081 A | 8/2014 |
| CN | 104182059 A | 12/2014 |
| CN | 104881320 A | 9/2015 |
| EP | 1 336 955 B1 | 5/2006 |
| EP | 2707809 A1 | 3/2014 |
| EP | 2750759 A1 | 7/2014 |
| EP | 2849103 A2 | 3/2015 |
| GB | 2518192 A | 3/2015 |
| JP | 61-221873 A | 10/1986 |
| JP | 2004-21791 A | 1/2004 |
| JP | 2014165766 A | 9/2014 |
| WO | WO-2000/074394 A2 | 12/2000 |
| WO | WO-2002/031628 A2 | 4/2002 |
| WO | WO-2002/073449 A1 | 9/2002 |
| WO | WO-2002/073531 A1 | 9/2002 |
| WO | WO-2002/031628 A3 | 10/2002 |
| WO | WO 2006/010044 A2 | 1/2006 |
| WO | WO-2007/041221 A1 | 4/2007 |
| WO | WO-2009/014465 A2 | 1/2009 |
| WO | WO-2010/049925 A2 | 5/2010 |
| WO | WO-2010/051404 AI | 5/2010 |
| WO | WO-2012/071571 A2 | 5/2012 |
| WO | WO 2013/009613 A1 | 1/2013 |
| WO | WO-2013/042115 A2 | 3/2013 |
| WO | WO-2013/042116 A1 | 3/2013 |
| WO | WO 2013/177280 A1 | 11/2013 |
| WO | WO 2014/035402 A1 | 3/2014 |
| WO | WO 2014/098560 A2 | 6/2014 |
| WO | WO 2014/140977 A1 | 9/2014 |
| WO | WO 2014/187076 A1 | 11/2014 |
| WO | WO 2015/028844 A1 | 3/2015 |
| WO | WO 2015/113301 A1 | 8/2015 |
| WO | WO 2015/148278 A1 | 10/2015 |
| WO | WO 2015/164253 A1 | 10/2015 |
| WO | WO 2015/175338 A1 | 11/2015 |
| WO | WO 2016/004266 A2 | 1/2016 |

OTHER PUBLICATIONS

U.S. Appl. No. 14/914,461, filed Feb. 25, 2016; In re: Reiter et al., entitled *Text Generation From Correlated Alerts*.

U.S. Appl. No. 15/022,420, filed Mar. 16, 2016; In re: Mahamood, entitlted *Method and Apparatus for Document Planning*.

U.S. Appl. No. 15/074,425, filed Mar. 18, 2016; In re: Reiter, entitled *Method and Apparatus for Situational Analysis Text Generation*.

U.S. Appl. No. 15/093,337, filed Apr. 7, 2016; In re: Reiter, entitled *Method and Apparatus for Referring Expression Generation*.

U.S. Appl. No. 15/093,365, filed Apr. 7, 2016; In re: Logan et al., entitled *Method and Apparatus for Updating a Previously Generated Text*.

International Search Report and Written Opinion for Application No. PCT/IB2012/056513 dated Jun. 26, 2013.

International Search Report and Written Opinion for Application No. PCT/IB2012/056514 dated Jun. 26, 2013.

International Search Report and Written Opinion for Application No. PCT/IB2012/057773 dated Jul. 1, 2013.

International Search Report and Written Opinion for Application No. PCT/IB2012/057774 dated Sep. 20, 2013

International Search Report and Written Opinion for Application No. PCT/US2012/053115 dated Jul. 24, 2013.

International Search Report and Written Opinion for Application No. PCT/US2012/053127 dated Jul. 24, 2013.

International Search Report and Written Opinion for Application No. PCT/US2012/053128 dated Jun. 27, 2013.

International Search Report and Written Opinion for Application No. PCT/US2012/053156 dated Sep. 26, 2013.

International Search Report and Written Opinion for Application No. PCT/US2012/053183 dated Jun. 4, 2013.

International Search Report and Written Opinion for Application No. PCT/US2012/061051 dated Jul. 24, 2013.

International Search Report and Written Opinion for Application No. PCT/US2012/063343; dated Jan. 15, 2014.

International Search Report for Application No. PCT/IB2013/058131 dated Jul. 3, 2014.

Alawneh, A. L. et al., *Pattern Recognition Techniques Applied to the Abstraction of Traces of Inter-Process Communication*, Software Maintenance and Reengineering (CSMR), 2011 15th European Conference on Year: 2011, IEEE Conference Publications (2011) pp. 211-220.

Andre, E. et al., *From Visual Data to Multimedia Presentations, Grounding Presentations*, Integration of Sensory Information in Natural Language Processing, Artificial Intelligence and Neural networks, IEE Colloquium on (May 15, 1995) pp. 1-3.

Andre, E. et al., *Natural Language Access to Visual Data: Dealing with Space and Movement*, Report 63, German Research Center for Articial Intelligence (DFKI) SFB 314, Project VITRA, (Nov. 1989) 1-21.

Barzilay, R., et al., "Aggregation via Set Partitioning for Natural Language Generation;" Proceedings of the Human Language Technology Conference of the North American Chapter of the ACL; pp. 359-366; dated Jun. 2006.

(56) References Cited

OTHER PUBLICATIONS

Bhoedjang, R. A. F. et al., *Optimizing Distributed Data Structures Using Application-Specific Network Interface Software*, Parallel Processing, 1998, Proceedings; 1998 International Conference on Year; 1998, IEEE Conference Publications (1998) pp. 485-492.
Cappozzo, A. et al., *Surface-Marker Cluster Design Criteria for 3-D Bone Movement Reconstruction*, IEEE Transactions on Biomedical Engineering, vol. 44, No. 12 (Dec. 1997) 1165.
Dragon, R. et al., *Multi-Scale Clustering of Frame-to-Frame Correspondences for Motion Segmentation*, Computer Vision ECCV 2012, Springer Berlin Heidelberg (Oct. 7, 2012) 445-458.
Gatt, A. et al., *From Data to Text in the Neonatal Intensive Care Unit: Using NLG Technology for Decision Support and Information Management*, AI Communication (Jan. 1, 2009) 153-186.
Hercules, D., et al.; "*Aggregation in Natural Language Generation*," Trends in Natural Language Generation, an Artificial Intelligence Perspective; pp. 88-105; dated Apr. 1993.
Herzog, G. et al., *Combining Alternatives in the Multimedia Presentation of Decision Support Information for Real-Time Control*/IFIP (1998) 15 pages.
Kottke, D. P. et al., *Motion Estimation via Cluster Matching*, 8180 IEEE Transactions on Pattern Analysis and Machine Intelligence 16, No. 11 (Nov. 1994) 1128-1132.
Perry, B. et al., *Automatic Realignment of Data Structures to Improve MPI Performance*, Networks (ICN), 2010 Ninth International Conference on Year: 2010, IEEE Conference Publications (2010) pp. 42-47.
Quinlan, J. R., *Induction of Decision Trees*, Machine Learning, Kluwer Academic Publishers, vol. 1, No. 1 (Jan. 1, 1986) 81-106.
Radev, D. R. et al., *Generating Natural Language Summaries from Multiple On-Line Sources*, Association of Computational Linguistics, vol. 24, No. 3 (1998) 469-500.
Reiter, E., *An Architecture for Data-to-Text Systems*, Proceedings of ENLG-2007 (Jun. 20, 2007) 97-104.
Reiter, E. et al., *Building Applied Natural Language Generation Systems*, Natural Language Engineering 1 (1) (1995) 31 pages.
Shaw, J.; "*Clause Aggregation Using Linguistic Knowledge*;" Proceedings of IWNLG; pp. 138-147; dated Jan. 1998; retrieved from <http://acl.ldc.upenn.edu/W/W98-1415.pdf>.
Spillner, J. et al., *Algorithms for Dispersed Processing*, Utility and Cloud Computing (UC), 204 IEEE/ACM 7th International Conference on Year: 2014, IEEE Conferenced Publications (2014) pp. 914-921.
Voelz, D. et al., *Rocco: A RoboCup Soccer Commentator System*, German Research Center for Artificial Intelligence DFKI GmbH (1999) 11 pages.
Yu, J. et al., *Choosing the Content of Textual Summaries of Large Time-Series Data Sets*, Natural Language Engineering 13, (Jan. 1, 2007) pp. 1-28.
Statement in accordance with the Notice from the European patent Office dated Oct. 1, 2007 concerning business methods (OJ EPO Nov. 2007, 592-593, (XP002456414) 1 page.
Office Action for U.S. Appl. No. 14/023,023, dated Mar. 4, 2014.
Notice of Allowance for U.S. Appl. No. 14/023,023 dated Apr. 11, 2014.
Office Action for U.S. Appl. No. 14/023,056 dated Nov. 21, 2013.
Notice of Allowance for U.S. Appl. No. 14/023,056 dated Apr. 29, 2014.
U.S. Appl. No. 12/779,636; entitled "System and Method for Using Data to Automatically Generate a Narrative Story".
U.S. Appl. No. 13/186,308; entitled "Method and Apparatus for Triggering the Automatic Generation of Narratives".
U.S. Appl. No. 13/186,337; entitled "Method and Apparatus for Triggering the Automatic Generation of Narratives".
U.S. Appl. No. 13/186,346; entitled "Method and Apparatus for Triggering the Automatic Generation of Narratives".
U.S. Appl. No. 13/464,635; entitled "Use of Tools and Abstraction in a Configurable and Portable System for Generating Narratives".
U.S. Appl. No. 13/464,675; entitled "Configurable and Portable System for Generating Narratives".
U.S. Appl. No. 13/464,716; entitled "Configurable and Portable System for Generating Narratives".
U.S. Appl. No. 14/023,023; entitled "Method and Apparatus for Alert Validation;" filed Sep. 10, 2013.
U.S. Appl. No. 14/023,056; entitled "Method and Apparatus for Situational Analysis Text Generation;" filed Sep. 10, 2013.
U.S. Appl. No. 14/027,684, filed Sep. 16, 2013; In re: Sripad et al., entitled *Method, Apparatus and Computer Program Product for User-Directed Reporting*.
U.S. Appl. No. 14/027,775; entitled "Method and Apparatus for Interactive Reports", filed Sep. 16, 2013.
Gorelov, S. S. et al.., *Search Optimization in Semistructured Databases Using Hierarchy of Document Schemas*, Programming and Computer Software, vol. 31, No. 6 (Nov. 1, 2005) pp. 321-331.
Leonov, A. V. et al., *Construction of an Optimal Relational Schema for Storing XML Documents in an RDBMS Without Using DTD/XML Schema*, Programming and Computer Software, vol. 30, No. 6 (Nov. 1, 2004) pp. 323-336.
Reiter, E. et al., *Building Natural Language Generation Systems*, Cambridge University Press (2000), 138 pages.
International Search Report and Written Opinion for Application No. PCT/IB2013/050375 dated May 7, 2013.
Chang-Jie, M. et al., *Interactive Location-based Services Combined with Natural Language*, International Conference on Wireless Communications, Networking and Mobile Computing (2007) 3015-3018.
Guoqiang, D. et al., *The Research on Interactive short Message Response*, Workshop on Intelligent Information Technology Application, IEEE Conference Publications (2007) 206-209.
International Preliminary Report on Patentability for Application No. PCT/IB2012/056513 dated May 19, 2015.
International Preliminary Report on Patentability for Application No. PCT/IB2012/056514 dated May 19, 2015.
International Preliminary Report on Patentability for Application No. PCT/IB2012/057773 dated Jun. 30, 2015.
International Preliminary Report on Patentability for Application No. PCT/IB2012/057774 dated Jun. 30, 2015.
International Preliminary Report on Patentability for Application No. PCT/IB2013/050375 dated Jul. 21, 2015.
International Preliminary Report on Patentability for Application No. PCT/IB2013/058131 dated May 5, 2015.
International Preliminary Report on Patentability for Application No. PCT/IB2014/060846 dated Oct. 18, 2016.
International Preliminary Report on Patentability for Application No. PCT/US2012/053115 dated Mar. 3, 2015.
International Preliminary Report on Patentability for Application No. PCT/US2012/053127 dated Mar. 3, 2015.
International Preliminary Report on Patentability for Application No. PCT/US2012/053128 dated Mar. 3, 2015.
International Preliminary Report on Patentability for Application No. PCT/US2012/053156 dated Mar. 3, 2015.
International Preliminary Report on Patentability for Application No. PCT/US2012/053183 dated Mar. 3, 2015.
International Preliminary Report on Patentability for Application No. PCT/US2012/061051 dated Mar. 3, 2015.
International Preliminary Report on Patentability for Application No. PCT/US2012/063343 dated May 5, 2015.
International Search Report and Written Opinion for Application No. PCT/IB2013/058131 dated Jul. 3, 2014.
International Search Report and Written Opinion for Application No. PCT/IB2014/060846 dated Feb. 4, 2015.
Notice of Allowance for U.S. Appl. No. 14/027,684 dated Mar. 21, 2016.
Notice of Allowance for U.S. Appl. No. 14/027,775 dated Aug. 12, 2015.
Notice of Allowance for U.S. Appl. No. 14/027,775 dated Sep. 10, 2015.
Notice of Allowance for U.S. Appl. No. 14/311,806 dated Dec. 28, 2016.
Notice of Allowance for U.S. Appl. No. 14/311,998 dated Dec. 22, 2015.
Notice of Allowance for U.S. Appl. No. 14/311,998 dated Jan. 21, 2016.

(56) References Cited

OTHER PUBLICATIONS

Notice of Allowance for U.S. Appl. No. 14/634,035 dated Mar. 30, 2016.
Office Action for U.S. Appl. No. 14/027,684 dated Oct. 6, 2015.
Office Action for U.S. Appl. No. 14/027,775 dated Jul. 13, 2015.
Office Action for U.S. Appl. No. 14/311,806 dated Jun. 10, 2016.
Office Action for U.S. Appl. No. 14/311,998 dated Feb. 20, 2015.
Office Action for U.S. Appl. No. 14/311,998 dated Oct. 7, 2015.
Office Action for U.S. Appl. No. 14/634,035 dated Aug. 28, 2015.
Office Action for U.S. Appl. No. 14/634,035 dated Dec. 10, 2015.
Office Action for U.S. Appl. No. 14/634,035 dated Mar. 30, 2016.
Office Action for U.S. Appl. No. 15/022,420 dated May 18, 2017.
Office Action for U.S. Appl. No. 14/760,848 dated May 11, 2017.
Office Action for U.S. Appl. No. 15/074,425 dated May 10, 2017.
Office Action for U.S. Appl. No. 15/186,927 dated May 1, 2017.
Office Action for U.S. Appl. No. 15/188,423 dated Oct. 23, 2017.
Office Action for U.S. Appl. No. 15/421,921 dated Sep. 27, 2017.
Premchaiswadi, W. et al., *Enhancing Learning Systems by using Virtual Interactive Classrooms and Web-based Collaborative Work*, Education Engineering (EDUCON) IEEE Conference Publications, (2010) 1531-1537.
Reiter, E., *Chapter 4: Document Planning (early draft) Building Natural Language Generation Systems* (2005) 73-113 [Retrieved from the Internet Nov. 2, 2017: <http://www.ling.helsinki.fi/~gwilcock/Tartu-2003/ReiterDale/4-DocumentPlanning.pdf>].
Seki, Y., *XML Transformation-based three-stage pipelined Natural Language Generation System*, Proc. of 6th NLP Pacific Rim Symposium (NLPRS 2001) (2001) 767-768 [Retrieved from the Internet Nov. 2, 2017: <http://www.afnlp.org/archives/nlprs2001/pdf/exh-04-01.pdf>].
Takeuchi, Y. et al., *Human Prosocial Response to Emotive Facial Expression of Interactive Agent*, The 15th IEEE International Symposium on Robot and Human Interactive Communication (2006), 680-685.
U.S. Appl. No. 14/311,998, entitled Method and Apparatus for Situational Analysis Text Generation; In re: Reiter; filed Jun. 23, 2014.
U.S. Appl. No. 14/634,035, entitled Method and Apparatus for Annotating a Graphical Output; In re: Reiter; filed Feb. 27, 2015.
U.S. Appl. No. 14/760,848, entitled Method and Apparatus for Document Planning; In re: Sripada; filed Jul. 14, 2015.
U.S. Appl. No. 14/961,222, entitled Method and Apparatus for Interactive Reports; In re: Dale et al., filed Dec. 7, 2015.
U.S. Appl. No. 14/311,806; entitled Method and Apparatus for Alert Validation; In re: Reiter, filed Jun. 23, 2014.
U.S. Appl. No. 15/186,927, filed Jun. 20, 2016; In re: Sripada, entitled Method, Apparatus, and Computer Program Product for User-Directed Reporting.
U.S. Appl. No. 15/188,423, filed Jun. 21, 2016; In re: Reiter, entitled Method and Apparatus for Annotating a Graphical Output.
U.S. Appl. No. 15/421,921, filed Feb. 1, 2017; In re: Reiter, entitled Method and Apparatus for Alert Validation.
Wilcox, G., *An Overview of Shallow XML-Based Natural Language Generation*, Baltic HLT (2005) 67-78 [Retrieved from the Internet Nov. 2, 2017: <https://www.ling.helsinki.fi/~gwilcock/Pubs/2005/BalticHLT-05.pdf>].
Notice of Allowance for U.S. Appl. No. 15/421,921 dated Mar. 14, 2018.
Office Action for U.S. Appl. No. 15/022,420 dated Feb. 13, 2018.
Office Action for U.S. Appl. No. 15/074,425 dated Feb. 26, 2018.
Krahmer et al., "Computational Generation of Referring Expressions: A Survey," In Computational Linguistics, 38:173-218, (2012).
Paraboni, "Generating Referring Expressions: Making Referents Easy to Identify," In Computational Linguistics, 33(2):229-254, (2007).
Paraboni, "Generating references in hierarchical domains: the case of Document Deixis," University of Brighton PhD thesis, pp. 1-207, (2003).
Siddharthan et al., "Generating referrng expressions in open domains," In Proceedings of ACL 2004, pp. 1-8, (2004).
Applicant Initiated Interview Summary for U.S. Appl. No. 14/822,349 dated Feb. 13, 2018.
Notice of Allowance for U.S. Appl. No. 14/634,074 dated Jun. 30, 2015.
Notice of Allowance for U.S. Appl. No. 14/634,119 dated Feb. 2, 2016.
Office Action for U.S. Appl. No. 14/634,074 dated Apr. 17, 2015.
Office Action for U.S. Appl. No. 14/634,119 dated Apr. 21, 2015.
Office Action for U.S. Appl. No. 14/634,119 dated Oct. 23, 2015.
Office Action for U.S. Appl. No. 14/822,349 dated Jan. 20, 2017.
Office Action for U.S. Appl. No. 14/822,349 dated Jun. 27, 2018.
Office Action for U.S. Appl. No. 14/822,349 dated Nov. 13, 2017.
Office Action for U.S. Appl. No. 14/822,349 dated Sep. 2, 2016.
Office Action for U.S. Appl. No. 14/961,222 dated Mar. 3, 2018.
Office Action for U.S. Appl. No. 15/093,337 dated Apr. 4, 2018.
Office Action for U.S. Appl. No. 15/093,337 dated Jun. 29, 2017.
Office Action for U.S. Appl. No. 15/186,927 dated Jul. 3, 2018.
Office Action for U.S. Appl. No. 15/186,927 dated Nov. 17, 2017.
Office Action for U.S. Appl. No. 15/188,423 dated Jul. 20, 2018.
U.S. Appl. No. 14/634,074, entitled Method and Apparatus for Configurable Microplanning; In re: Reiter; filed Feb. 27, 2015.
U.S. Appl. No. 14/822,349; entitled Method and Apparatus for Configurable Microplanning; In re: Reiter, filed Aug. 10, 2015.
Buschmeier et al, "An alignment-capable microplanner for natural language generation," Proceedings of the 12th European Workshop on Natural Language Generation. Association for Computational Linguistics, pp. 82-89, (2009).
Theune, "Natural Language Generation for dialogue: sysem survey," Thesis , University of Twene, pp. 1-47, (2003).
Notice of Allowance for U.S. Appl. No. 14/961,222 dated Nov. 16, 2018.
Notice of Allowance for U.S. Appl. No. 15/186,927 dated Dec. 20, 2018.
Notice of Allowance for U.S. Appl. No. 15/188,423 dated Dec. 28, 2018.
Office Action for U.S. Appl. No. 15/074,425 dated Nov. 27, 2018.
Office Action for U.S. Appl. No. 15/093,337 dated Dec. 14, 2018.
Office Action for U.S. Appl. No. 15/188,423 dated Oct. 30, 2018.
Office Action for U.S. Appl. No. 16/009,006 dated Dec. 3, 2018.
Office Action for U.S. Appl. No. 15/022,420 dated Sep. 28, 2018.
Notice of Allowance for U.S. Appl. No. 16/009,006 dated Jul. 31, 2019.
Office Action for U.S. Appl. No. 14/822,349 dated Dec. 26, 2018.
Office Action for U.S. Appl. No. 14/822,349 dated Mar. 22, 2019.
Office Action for U.S. Appl. No. 15/022,420 dated Apr. 22, 2019.
Notice of Allowance for U.S. Appl. No. 15/022,420 dated Jan. 17, 2020.
Office Action for U.S. Appl. No. 15/074,425 dated Oct. 4, 2019.
Notice of Allowance for U.S. Appl. No. 15/074,425 dated May 8, 2020.
Office Action for U.S. Appl. No. 16/367,095 dated May 28, 2020.

* cited by examiner

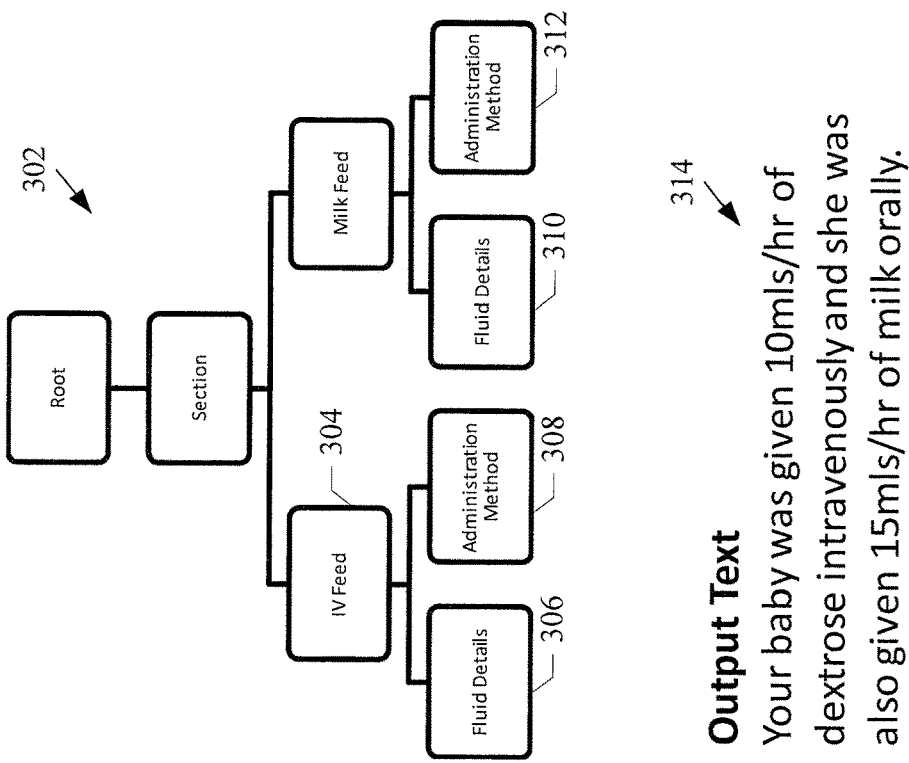

Output Text
Your baby was given 10mls/hr of dextrose intravenously and she was also given 15mls/hr of milk orally.

FIG. 3

```
<?xml version="1.0"?>
<!-- Baby Feed Section Example-->
<document xmlns:xsi="http://www.w3.org/2001/XMLSchema-instance
xsi:noNamespaceSchemaLocation="docplanner-schema.xsd" title="Baby Feed Section">
  <template id="Baby Feed" type="root">
    <section id="babyfeedSection">
      <sentence id="ivfeedSen" focus="true">
        <message-single-query>
          <messagestore-class>IV_FEED</messagestore-class>
          <order-by>
            <order-by-property name="date_of_entry"
order="descending" />
          </order-by>
        </message-single-query>
      </sentence>
      <sentence id="milkfeedSen" focus="false">
        <message-single-query>
          <messagestore-class>MILK_FEED</messagestore-class>
          <order-by>
            <order-by-property name="date_of_entry"
order="descending" />
          </order-by>
        </message-single-query>
      </sentence>
    </section>
  </template>
</document>
```

METHOD AND APPARATUS FOR GENERATING A LINGUISTIC REPRESENTATION OF RAW INPUT DATA

TECHNOLOGICAL FIELD

Embodiments of the present invention relate generally to natural language generation technologies and, more particularly, relate to a method, apparatus, and computer program product for document planning.

BACKGROUND

In some examples, a natural language generation (NLG) system is configured to transform raw input data that is expressed in a non-linguistic format into a format that can be expressed linguistically, such as through the use of natural language. For example, raw input data may take the form of a value of a stock market index over time and, as such, the raw input data may include data that is suggestive of a time, a duration, a value and/or the like. Therefore, an NLG system may be configured to input the raw input data and output text that linguistically describes the value of the stock market index; for example, "securities markets rose steadily through most of the morning, before sliding downhill late in the day."

Data that is input into a NLG system may be provided in, for example, a recurrent formal structure. The recurrent formal structure may comprise a plurality of individual fields and defined relationships between the plurality of individual fields. For example, the input data may be contained in a spreadsheet or database, presented in a tabulated log message or other defined structure, encoded in a 'knowledge representation' such as the resource description framework (RDF) triples that make up the Semantic Web and/or the like. In some examples, the data may include numerical content, symbolic content or the like. Symbolic content may include, but is not limited to, alphanumeric and other non-numeric character sequences in any character encoding, used to represent arbitrary elements of information. In some examples, the output of the NLG system is text in a natural language (e.g. English, Japanese or Swahili), but may also be in the form of synthesized speech.

BRIEF SUMMARY

Methods, apparatuses, and computer program products are described herein that are configured to be embodied as and/or performed by a document planner in a natural language generation system. In some example embodiments, a method is provided that comprises selecting a schema based on one or more messages available in a message store and using the selected schema and the one or more messages available in the message store to generate a document plan. The schema of this embodiment may include one or more queries for selecting one or more messages from the message store, one or more messages, and/or predefined text. In some example embodiments, an optimization specification may be applied to optimize the document plan. Such optimization specification may be applied during the generation of the document plan or to a completed document plan. In some example embodiments, the optimization specification comprises rules for at least one of modifying the document plan and/or selecting a subset of the document plan. The document planner of this embodiment may then output the document plan to a microplanner or the like.

BRIEF DESCRIPTION OF THE DRAWINGS

Figure 1:
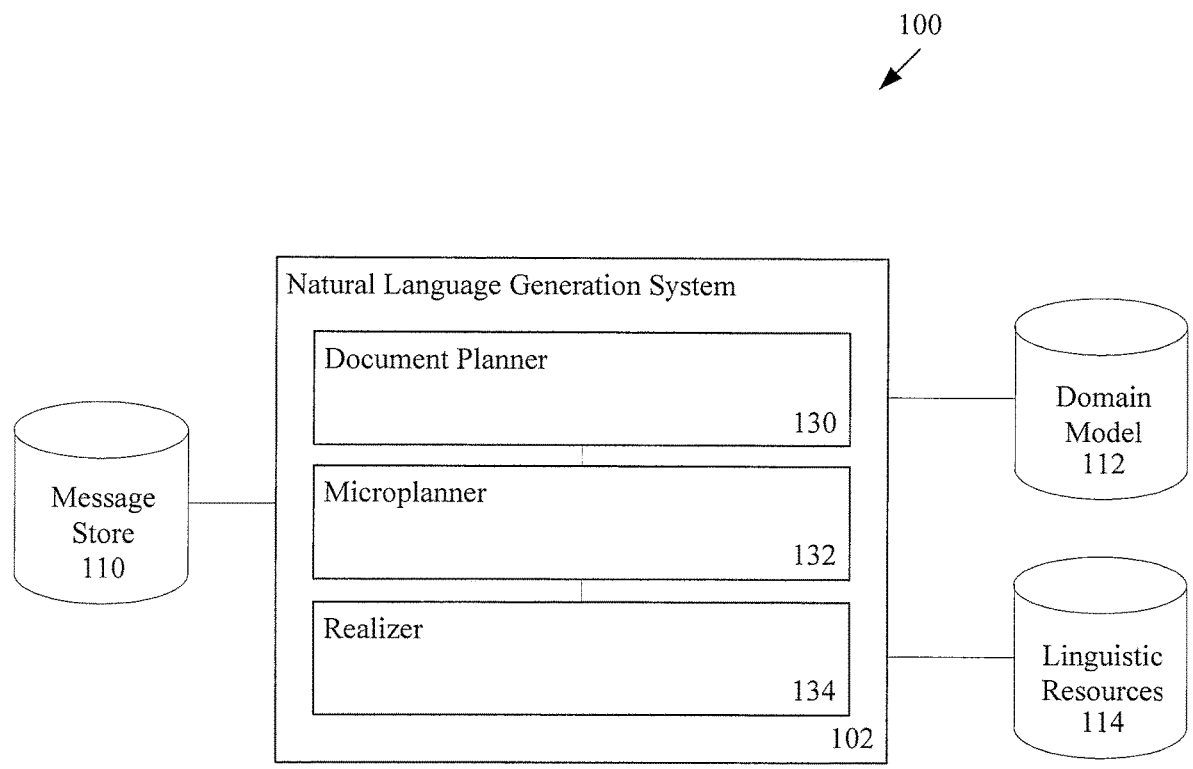
Figure 2:
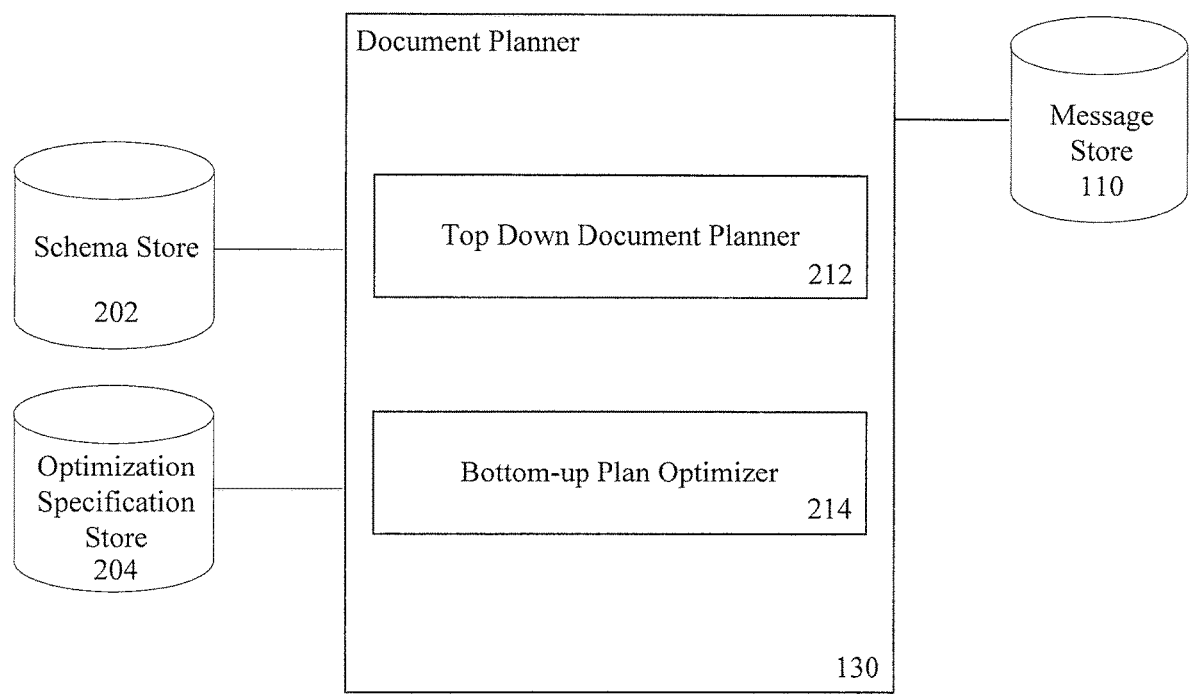
Figure 4:
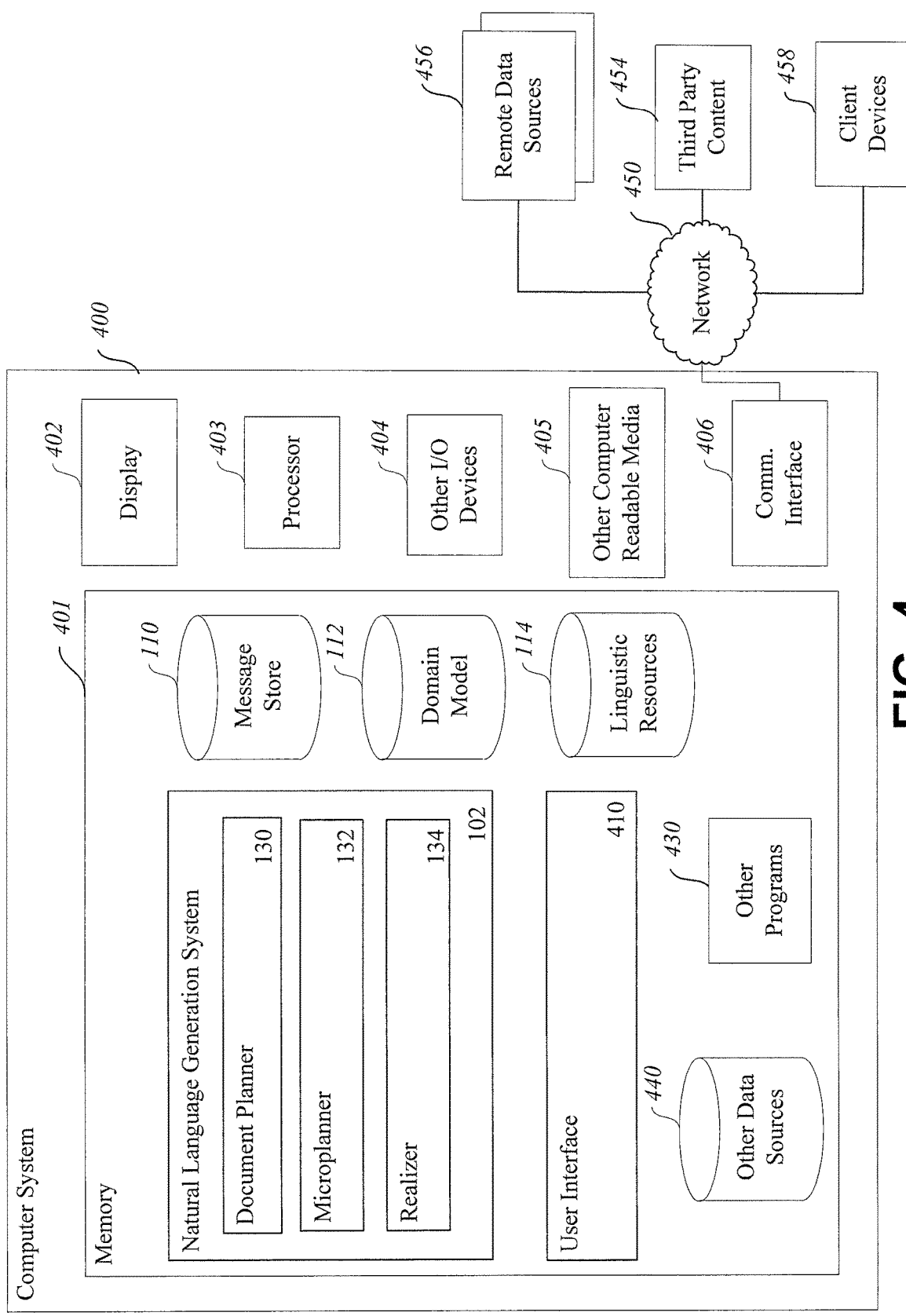
Figure 5:
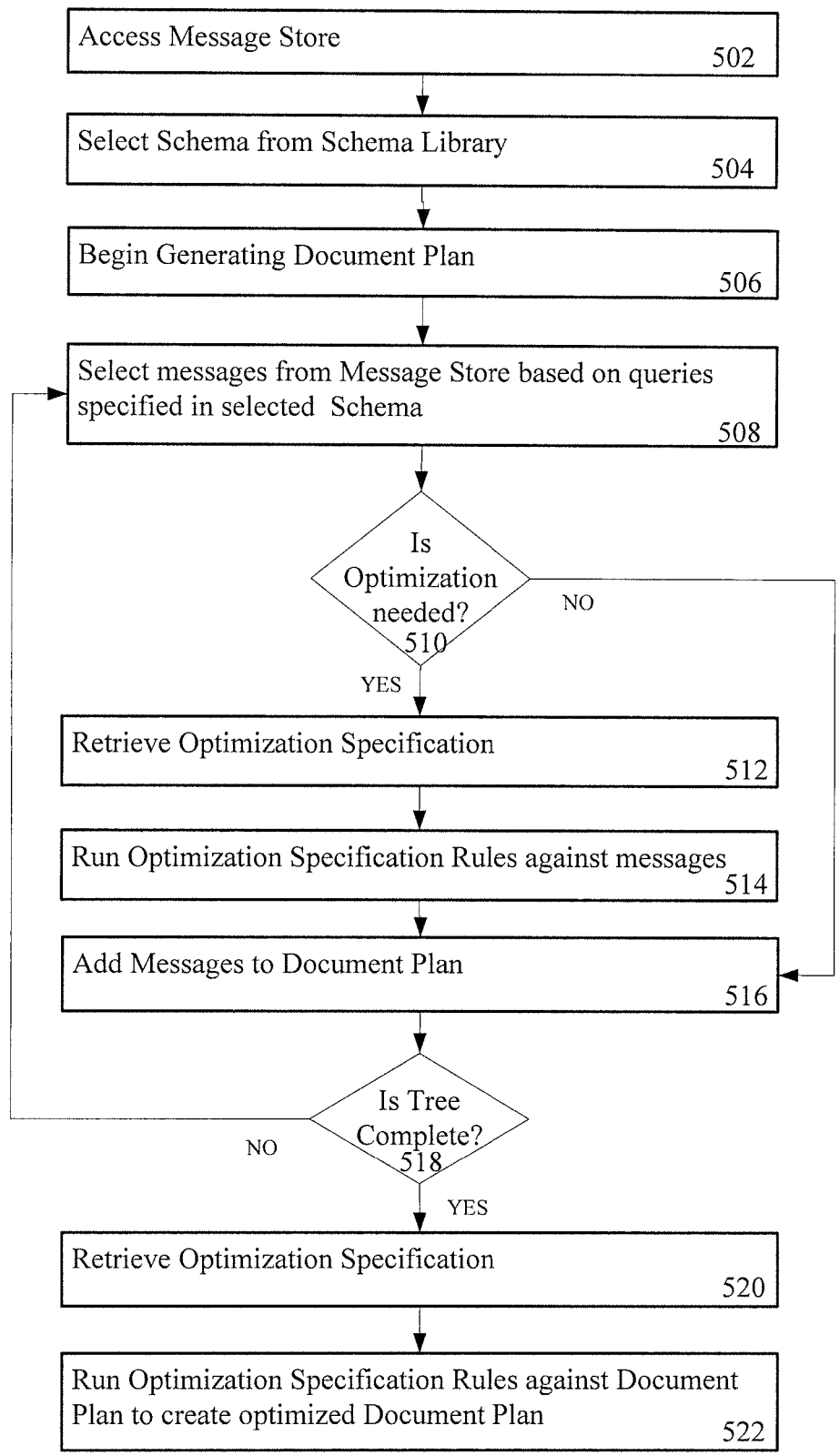
Figure 6:
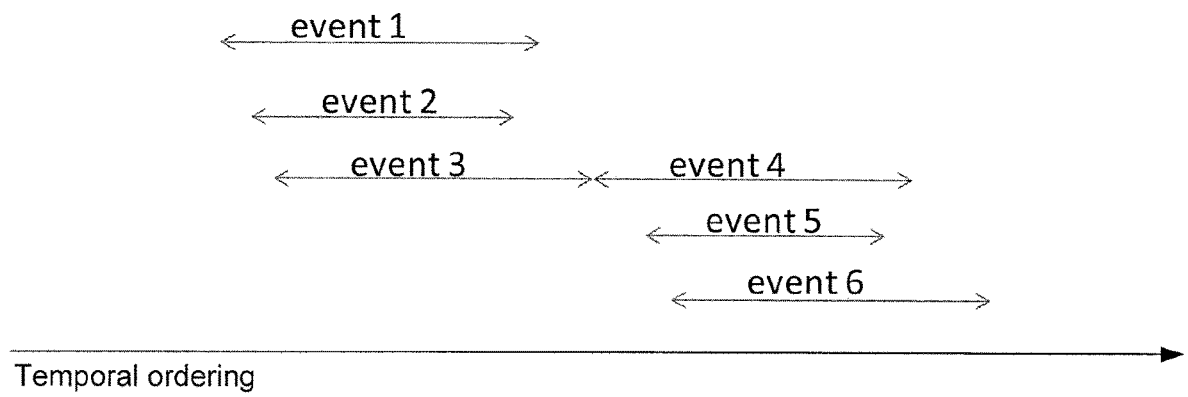
Figure 7A:
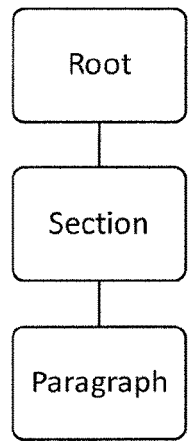
Figure 7B:
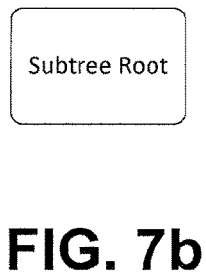
Figure 7C:
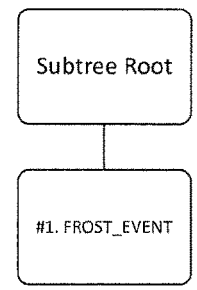
Figure 7D:
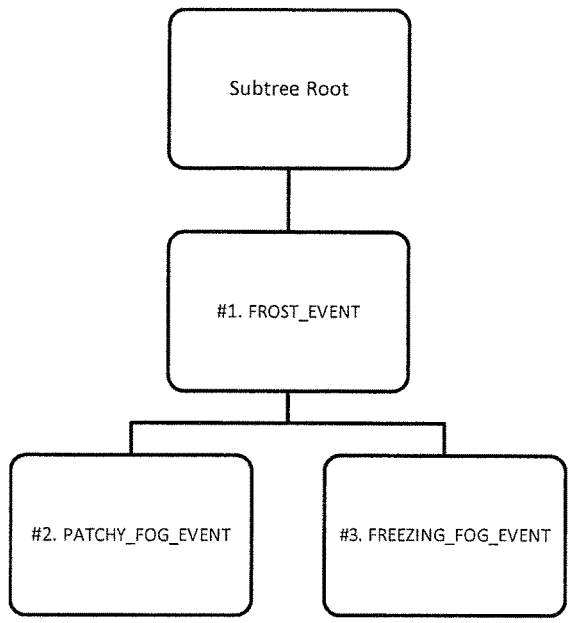
Figure 7E:
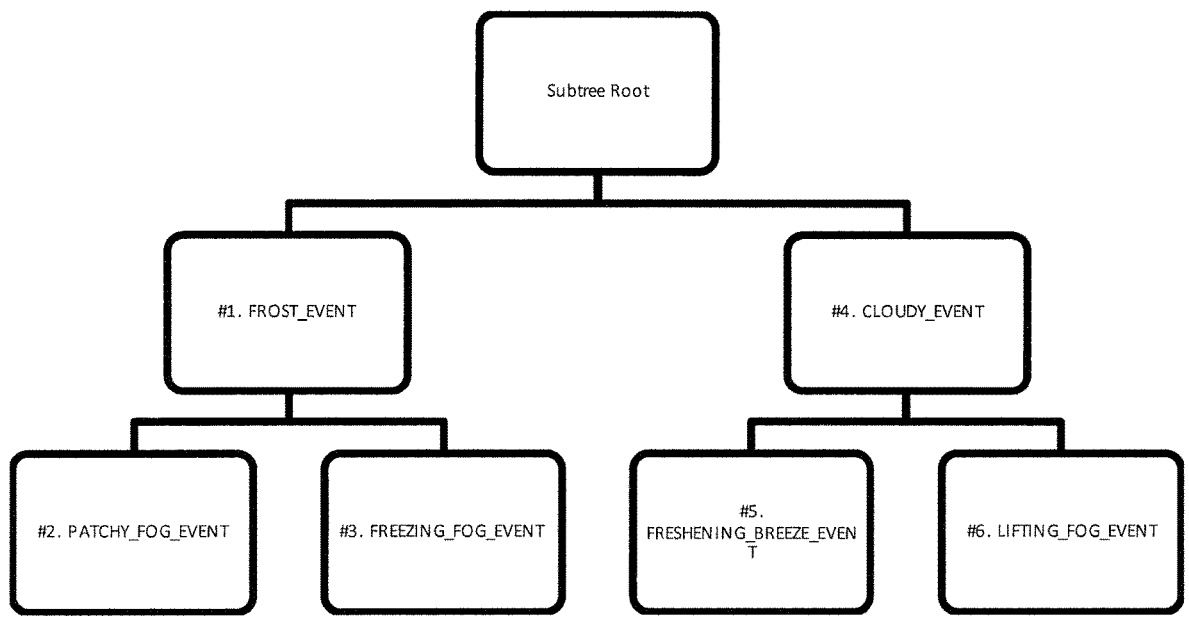
Figure 7F:
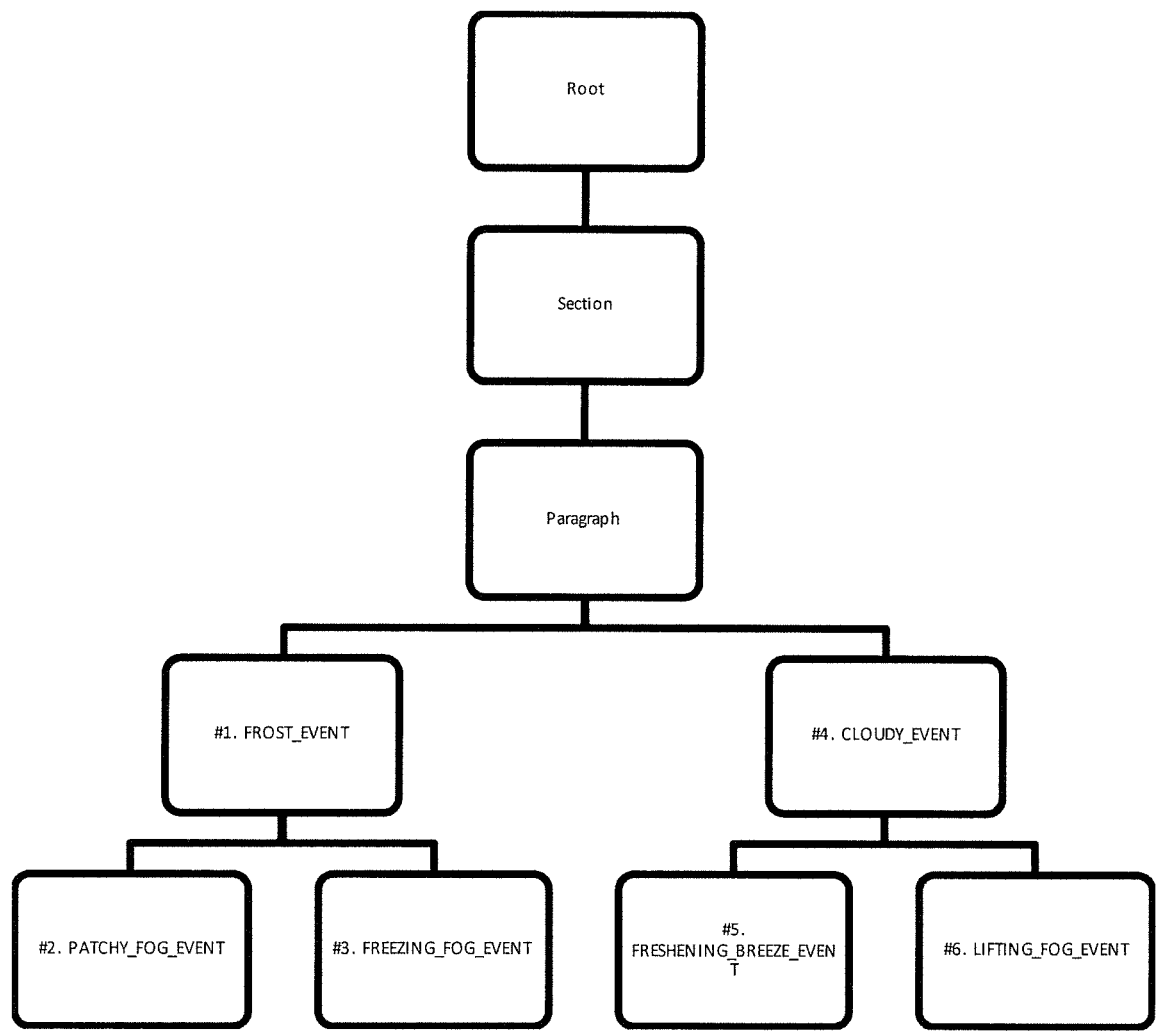
Figure 7G:
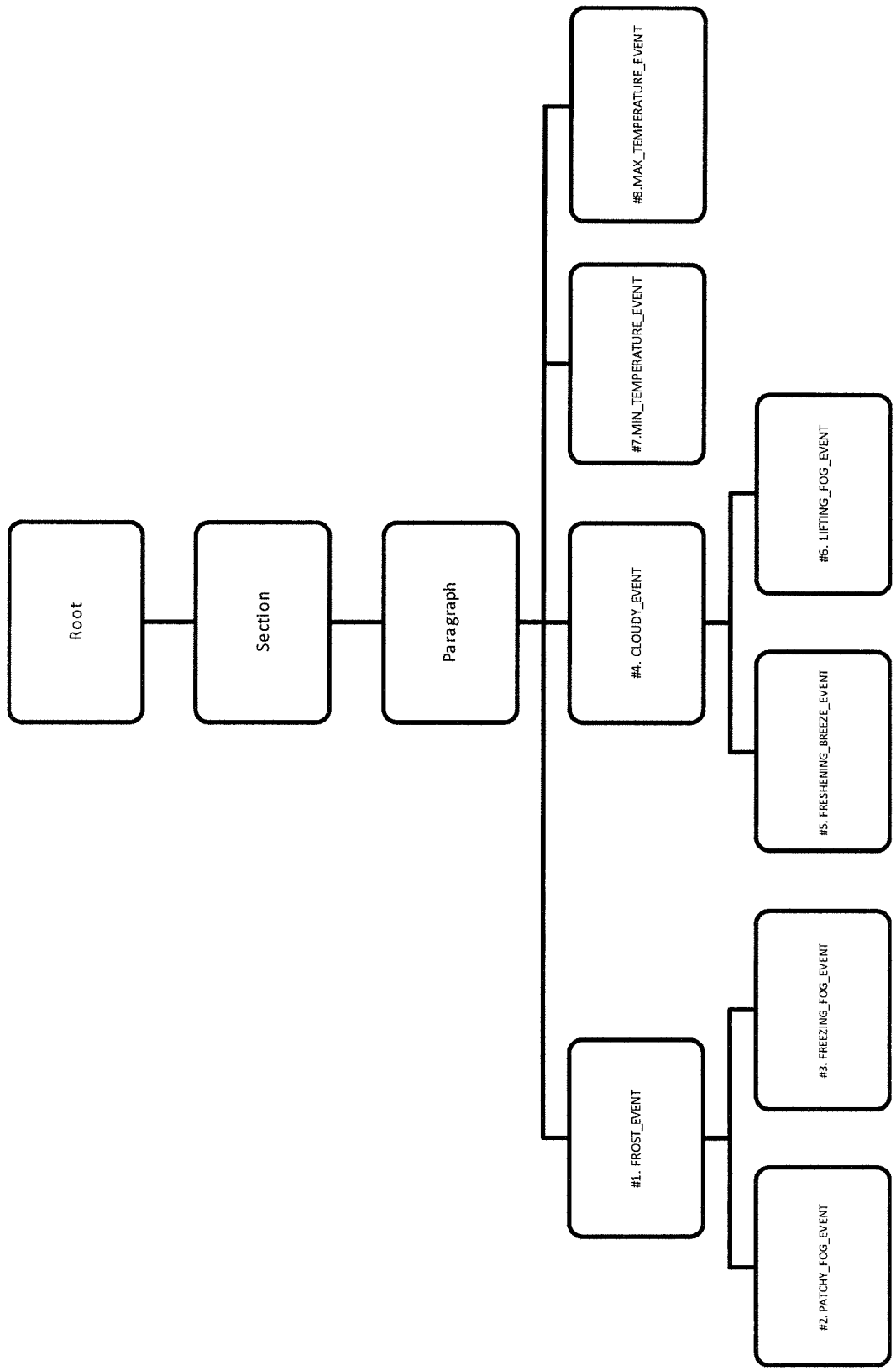
Figure 8:
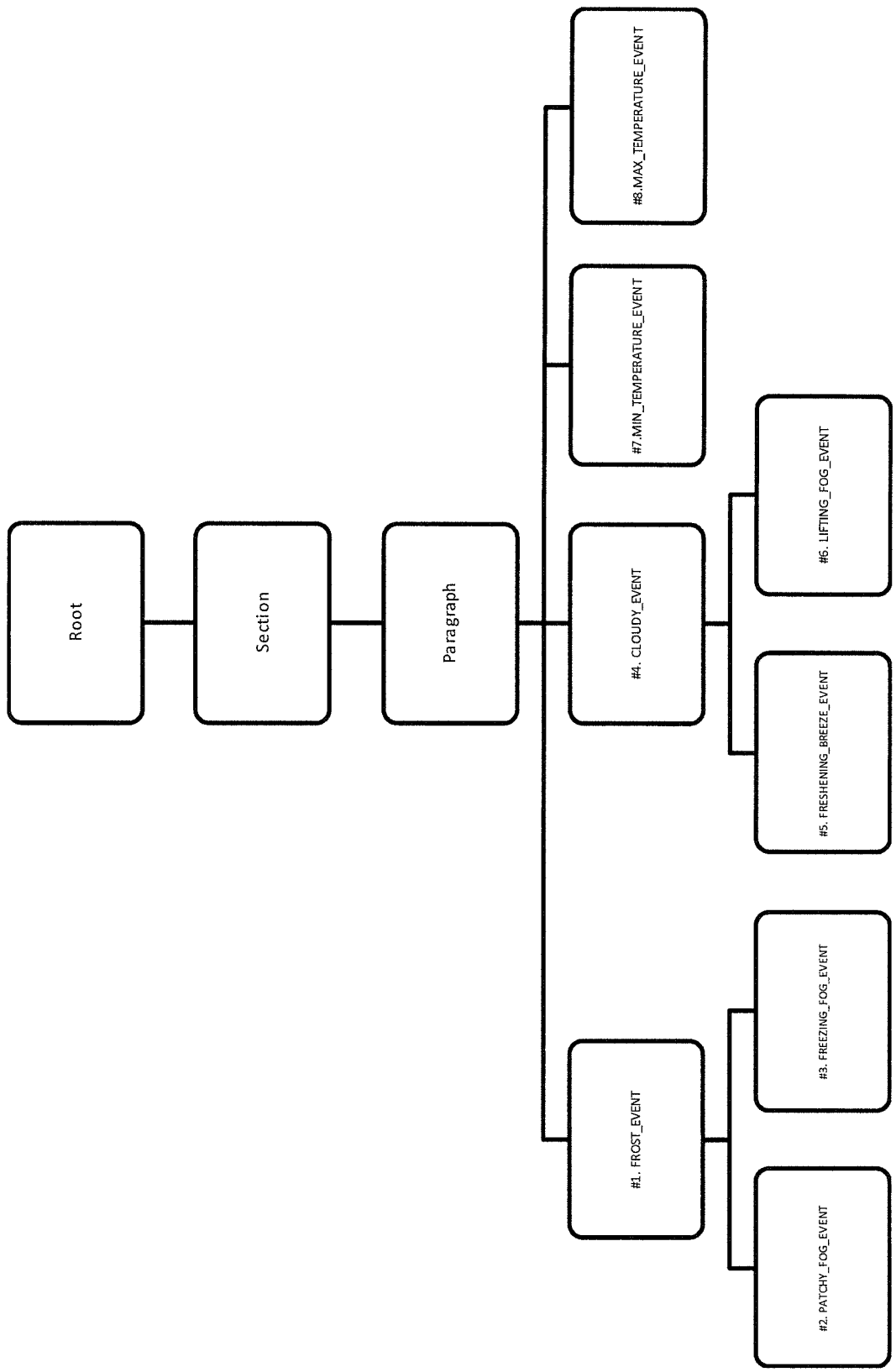

Having thus described embodiments of the invention in general terms, reference will now be made to the accompanying drawings, which are not necessarily drawn to scale, and wherein:

FIG. 1 is a schematic representation of a natural language generation environment that may benefit from some example embodiments of the present invention;

FIG. 2 illustrates an example document planner according to some example embodiments described herein;

FIG. 3 illustrates an example document plan in accordance with some example embodiments of the present invention;

FIG. 4 illustrates a block diagram of an apparatus that embodies a natural language generation system in accordance with some example embodiments of the present invention;

FIG. 5 illustrates a flowchart of operations that may be performed by a document planner in accordance with some example embodiments of the present invention;

FIG. 6 illustrates the temporal order of messages used in a document plan in accordance with some example embodiments of the present invention;

FIGS. 7a-7g illustrate generating an example document plan in accordance with some example embodiments of the present invention; and FIG. 8 illustrates an example document plan in accordance with some example embodiments of the present invention.

DETAILED DESCRIPTION

Example embodiments will now be described more fully hereinafter with reference to the accompanying drawings, in which some, but not all embodiments are shown. Indeed, the embodiments may take many different forms and should not be construed as limited to the embodiments set forth herein; rather, these embodiments are provided so that this disclosure will satisfy applicable legal requirements. Like reference numerals refer to like elements throughout. The terms "data," "content," "information," and similar terms may be used interchangeably, according to some example embodiments, to refer to data capable of being transmitted, received, operated on, and/or stored. Moreover, the term "exemplary", as may be used herein, is not provided to convey any qualitative assessment, but instead merely to convey an illustration of an example. Thus, use of any such terms should not be taken to limit the spirit and scope of embodiments of the present invention.

Natural language generation (NLG) is a field of study devoted to building technology to map data or other underlying information into natural language text. The generation of natural language texts involves subtasks such as document planning, microplanning and realization. In some example embodiments, document planning includes the process of selecting and mapping fragments of data, information or the like (e.g. messages) into data structures (e.g. document plan trees or the like), such that the data structures can be further processed into text specifications (e.g. phrase specifications, sentence plans or the like) by a microplanner so that the document plan may be expressed in natural language. In other words, a document planner, such as the document planner described herein, is configured to select information (e.g. messages) to be communicated in a text and to determine how to order and structure the selected information into sentences and paragraphs.

The task of document planning can be described as selecting a subset of messages from an input message set that fulfills the informational requirements of the user (e.g. a message store), partitioning the selected subset of messages into sentences and paragraphs, and ordering the messages for each of the partitions. An exhaustive search based method to find an appropriate document plan through all possible combinations of selection, partitioning and ordering of messages is computationally very expensive. As such, a knowledge-based approach may be appropriate for document planning. In addition, it may not be possible to identify a single unique document plan because there could be more than one document plan appropriate for a particular communicative context. Therefore document planning may further involve finding an optimum document plan among a number of alternative document plans.

In some examples, and as is described herein, a document planner may be configured using top-down planning and bottom-up narrative optimization. Top-down planning is a type of document planning, used by a document planner, which may use schemas to define the structure of the document. A schema is a template that specifies how a particular document plan should be constructed from constituent elements, where those constituent elements may be individual messages or, recursively, instantiations of other schemas. As is described herein, a schema may be expressed using a plan specification in terms of ordered messages or queries to retrieve messages. An example schema may specify a document plan which controls the global structure and global coherence of a generated text, as well as the conditions under which the schema is applicable.

Bottom-up narrative optimization achieves required variations of a document plan when variations of a schema are possible, such as when the global structure and/or ordering of messages is underspecified in a schema. Bottom-up narrative optimization may provide functions such as locally ordering multiple returned messages, globally reordering messages to achieve variation, and/or inserting or deleting subtrees of additional messages into a document plan tree. As is described herein, bottom-up narrative optimization may be configured to use an optimization specification that operates on a document plan or a set of messages. The optimization specification may be configured to control, in some examples, discourse features such as local coherence, continuity, text size, text fluency, discourse-focus maintenance and narration development. In some example embodiments, top-down planning may be combined with bottom-up narrative optimization to generate a document plan that may be input to, or otherwise be accessed by, a microplanner in a natural language generation system. In some embodiments, bottom-up narrative optimization may be used during generation of a document plan by top-down planning and/or bottom-up narrative optimization may be used to modify a document plan once top-down planning is complete.

FIG. 1 is an example block diagram of example components of an example natural language generation environment 100. In some example embodiments, the natural language generation environment 100 comprises a natural language generation system 102, a message store 110, a domain model 112 and/or linguistic resources 114. The natural language generation system 102 may take the form of, for example, a code module, a component, circuitry, and/or the like. The components of the natural language generation environment 100 are configured to provide various logic (e.g. code, instructions, functions, routines and/or the like) and/or services related to a document planner.

A message store 110 is configured to store one or more messages that are accessible by the natural language generation system 102. Messages are language independent data structures that correspond to informational elements in a text and/or collect together underlying data, referred to as slots, arguments or features, which can be presented within a fragment of natural language such as a phrase or sentence. Messages may be represented in various ways; for example, each slot may consist of a named attribute and its corresponding value; these values may recursively consist of sets of named attributes and their values, and each message may belong to one of a set of predefined types. The concepts and relationships that make up messages may be drawn from an ontology (e.g. a domain model 112) that formally represents knowledge about the application scenario.

In some examples, the domain model 112 is a representation of information about a particular domain. For example, a domain model may contain an ontology that specifies the kinds of objects, concepts and/or the like that may exist in the domain in concrete or abstract form, properties that may be predicated of the objects, concepts and the like, relationships that may hold between the objects, concepts and the like, and representations of any specific knowledge that is required to function in the particular domain.

In some examples, messages are created based on a requirements analysis as to what is to be communicated for a particular scenario (e.g. for a particular domain or genre). A message typically corresponds to a fact about the underlying data (for example, the existence of some observed event) that could be expressed via a simple sentence (although it may ultimately be realized by some other linguistic means). For example, to linguistically describe wind, a user may want to know a speed, a direction, a time period or the like, but the user may also want to know changes in speed over time, warm or cold fronts, geographic areas and or the like. In some cases, users do not even want to know wind speed values, but instead want an indication that describes the presence of a dangerous wind condition. Thus, a message related to wind speed may include fields to be populated by data related to the speed, direction, time period or the like, and may have other fields related to different time points, front information or the like. The mere fact that wind exists may be found in the data, but to linguistically describe "light wind" or "gusts" different data interpretation must be undertaken as is described herein.

In some examples, a message is created in an instance in which the raw input data warrants the construction of such a message. For example, a wind message would only be constructed in an instance in which wind data was present in the raw input data. Alternatively or additionally, while messages may correspond directly to observations taken from a raw data input, others may be derived from the observations by means of a process of inference or based on one or more detected events. For example, the presence of rain may be indicative of other conditions, such as the potential for snow at some temperatures.

Messages may be instantiated based on many variations of source data, such as but not limited to time series data, time and space data, data from multiple data channels, an ontology, sentence or phrase extraction from one or more texts, a text, survey responses, structured data, unstructured data and/or the like. For example, in some cases, messages may be generated based on text related to multiple news articles focused on the same or similar news stories in order to generate a news story; whereas in other examples, messages may be built based on survey responses and/or event data.

Messages may be annotated with an indication of their relative importance; this information can be used in subsequent processing steps or by the natural language generation system 102 to make decisions about which information may be conveyed and which information may be suppressed. Alternatively or additionally, messages may include information on relationships between the one or more messages or an indication that a message is a focus of discourse.

In some example embodiments, a natural language generation system, such as natural language generation system 102, is configured to generate phrases, sentences, text or the like which may take the form of natural language text. The natural language generation system 102 comprises, in some example embodiments, a document planner 130, a microplanner 132 and/or a realizer 134. The natural language generation system 102 may also be in data communication with the message store 110, the domain model 112 and/or the linguistic resources 114. In some examples, the linguistic resources 114 include, but are not limited to, text schemas, aggregation rules, reference rules, lexicalization rules and/or grammar rules that may be used by one or more of the document planner 130, the microplanner 132 and/or the realizer 134. Other natural language generation systems may be used in some example embodiments, such as a natural language generation system as described in Building Natural Language Generation Systems by Ehud Reiter and Robert Dale, Cambridge University Press (2000), which is incorporated by reference in its entirety herein.

The document planner 130 is configured to input the one or more messages from the message store 110. The document planner 130 is further configured to determine how to arrange those messages in order to describe the patterns in the one or more data channels derived from the raw input data. The document planner 130 may comprise a content determination process that is configured to select the messages, such as the messages that contain a representation of the data that is to be output via a natural language text. For example, an intravenous feed message may be described prior to a milk feed message in output text describing the status of a baby's feeding. In other examples, an administration method message may be described after, but in relation to, a fluid details message. See, for example, the document plan tree 302 in FIG. 3. The document planner 130 is further described with reference to FIG. 2 below.

The output of the document planner 130 may be a tree-structured object or other data structure that is referred to in some embodiments as a document plan tree. In an instance in which a tree-structured object is chosen for the document plan, the leaf nodes of the document plan tree may contain the messages or pre-defined text to be presented in a document, and the intermediate nodes of the tree-structured object may be configured to indicate how the subordinate nodes are related (e.g. elaboration, consequence, contrast, sequence and/or the like) to each other, specify document structure (e.g. paragraph breaks), and/or the like. In some embodiments, nodes of the document plan tree may also contain parameters for use with a microplanner, such as microplanner 132.

The microplanner 132 is configured to construct a text specification based on the document plan output from the document planner 130, such that the document plan may be expressed in natural language. In some example embodiments, the microplanner 132 may perform aggregation, lexicalization and referring expression generation. In some examples, aggregation includes, but is not limited to, determining whether two or more messages can be combined together linguistically to produce a more complex sentence. For example, one or more events may be aggregated so that both of the events are described by a single sentence.

In some examples, lexicalization includes, but is not limited to, choosing particular words for the expression of concepts and relations. For example, the phrase "along with" may be used to describe coinciding conditions or "administered" may be used to describe the causal event.

In some examples, referring expression generation includes, but is not limited to, choosing how to refer to an entity so that it can be unambiguously identified by the reader. For example, in a first sentence "John Smith" and "a heart rate alarm" may be used where "he" and "it" may be used in subsequent sentences.

The output of the microplanner 132, in some example embodiments, is a tree-structured text specification whose leaf nodes are phrase specifications, and whose internal nodes express rhetorical relations between the leaf nodes. A phrase specification may correspond to a sentence or a sub-sentence fragment (e.g. a title) and are produced from one or more messages. A phrase specification is configured to contain one or more syntactic constituents (e.g. subject, verb, prepositional phrase and/or the like) and one or more syntactic features (e.g. tense).

A realizer 134 is configured to traverse a text specification output by the microplanner 132 to express the text specification in natural language. The realization process that is applied to each phrase specification in the text specification makes use of a grammar (e.g. the grammar of the linguistic resources 114) which specifies the valid syntactic constituents in the language and further provides a way of mapping from phrase specifications into the corresponding natural language sentences. The output of the process is, in some example embodiments, a well-formed natural language text. In some examples, the natural language text may include embedded mark-up.

FIG. 2 illustrates an example document planner 130 according to some example embodiments described herein. The document planner 130 is configured to build a document plan based on a top-down document planner 212 defined using a schema and a bottom-up plan optimizer 214 that makes use of an optimization specification.

A schema may be defined using a plan specification language that is configured to define one or more messages and/or one or more queries for messages to be included in the document plan and the order in which the messages are to be presented in the output document plan. For example, a schema may specify compulsory or optional queries that may be used to extract messages from message store 110 for instantiating the schema. A schema may additionally or alternatively specify one or more messages or predefined phrases for instantiating the schema. The one or more schemas may be stored in or accessible via a schema store 202.

The schema may be configured to represent the structure of the document plan, such as via Extensible Markup Language (XML). Advantageously, by defining a schema, such as by using XML as the specification language, a user may define the structure of a document plan and insert a particular message or set of messages in a particular location in the document, where the messages may be retrieved based on queries specified in the schema or the messages may be directly specified in the schema. For example, top-down schema may be represented using a specification such as below, and further illustrated in FIG. 3.

```xml
<?xml version="1.0"?>
<!- Baby Feed Section Example-->
<document xmlns:xsi=http://www.w3.org/2001/XMLSchema-instance
  xsi:noNamespaceSchemaLocation="docplanner-schema.xsd"
  title="Baby Feed Section">
  <template id="Baby Feed" type="root">
    <section id="babyfeedSection">
      <sentence id="ivfeedSen" focus="true">
        <message-single-query>
          <messagestore-class>IV_FEED</messagestore-class>
          <order-by>
            <order-by-property name="date_of_entry"
            order="descending" />
          </order-by>
        </message-single-query>
      </sentence>
      <sentence id="milkfeedSen" focus="false">
        <message-single-query>
          <messagestore-class>MILK_FEED</messagestore-class>
          <order-by>
            <order-by-property name="date_of_entry"
            order="descending" />
          </order-by>
        </message-single-query>
      </sentence>
    </section>
  </template>
</document>
```

As is shown in the example schema, multiple sections, and messages that make up sections, may be defined. In some examples and as shown above, the IV Feed message 304 of FIG. 3 may be defined in a node of the document plan as a message that will instantiate that particular location in the document plan if it is available in the message store 110.

This example schema specifies queries for an IV Feed message and a Milk feed message. The example schema further specifies that an IV Feed message should be followed by a milk feed message. In the message store, both the IV feed and the Milk feed messages may refer or link to other messages in the message store, such as a Fluid Details message (the details of the fluid given to the baby) and an Administration Method message (how the feed was actually administered). Because the messages are linked in the message store, there is no need to explicitly specify these messages in the schema. As the example schema contains queries that return only single messages, a top-down planning approach alone may be appropriate. If the queries of a schema return multiple messages, or if an order for multiple messages is not specified in the schema, generating the document plan may require the combination of top-down planning and bottom-up optimizations as described herein.

Alternatively or additionally, a schema may invoke sub-schemas. For example, a schema may invoke another schema for the purposes of building a particular paragraph or other section of the document plan In some example embodiments, the document planner 130 may include a top-down document planner 212 that provides functionality to generate document plans by instantiating one or more schemas selected from the schema store 202 and one or more messages selected from the message store 110. The schema may be expressed using a planning specification. As described above, the schema may contain queries for the selection of the one or more messages from the message store 110 based on at least one of user defined features; features possessed by the messages; features that describe the communicative context of the messages; or previously selected messages. Once the selected schema is instantiated by the top-down document planner 212, the top-down document planner 212 may output one or more document plans that represent the messages and/or pre-defined text to the bottom-up plan optimizer 214. The top-down document planner 212 is further described with respect to FIG. 5.

In some example embodiments, the document planner 130 may include a bottom-up plan optimizer 214 that is configured to apply an optimization specification during generation of the document plan or against the complete document plan output by the top-down document planner 212 to provide an optimized document plan for output, such as to microplanner 132. The bottom-up plan optimizer 214 is further described with respect to FIG. 5.

An optimization specification may be made up of functions that perform tasks such as locally ordering multiple returned messages, globally ordering messages, or inserting and/or deleting subtrees of additional messages, for example. Such planning functions may run in a fixed sequence or may be called from the top-down document planner as necessary.

An optimization specification may contain and execute rules comprised of triggering conditions and actions to be taken to generate a second set of one or more optimal document plans for output. For example, such rules may be of the form "if <condition> then <action1> else <action2>". In some embodiments, the rules may reference externally specified parameters, for example, message properties such as the start-time of an event used for ordering messages in the document plan. In some embodiments, the rules may also call support functions, such as an "importance(message)" function to compute the importance of a given message.

In some example embodiments, the optimization specification may comprise rules for document and/or text size, text fluency, repetition avoidance, determination of paragraph breaks, message ordering, ensuring narrative coherence, maintaining discourse focus, narration development, and/or the like. The optimization specification may also specify sequencing patterns for messages and aggregation of messages.

In some embodiments, rules may be domain specific, such as are acquired from a corpus or domain expert, which may be represented as follow-on rules. A follow-on rule associates a follow-on score with a pair of messages ordered in a specific sequence. A follow-on score might be estimated by analyzing a corpus to determine the proportion of times a pair of messages appears in a specific order in the corpus. Alternatively domain experts could specify follow-on scores. For example, a follow-on rule may include "if lead_Message is A RAIN_EVENT and the follow_on_Message is A SKY_STATE_EVENT then follow_on_Score=1.0". This means that a RAIN_EVENT should always be (because the follow-on score is 1) ordered before a SKY_STATE_EVENT in the document plan. In some embodiments, rules may be domain independent, such as where messages in all domains have an "importance" property and rules may specify ordering, reordering, or inserting of messages based on the importance value. For example, a domain independent rule may include "if importance(incoming_Message)>highestImportance(currentDocPlan) then addToFront(incoming_Message, currentDocPlan)".

In some example embodiments, the bottom-up plan optimizer 214 may retrieve optimization specifications from an optimization specification store 204 to apply against a document plan generated by the top-down document planner 212. In some example embodiments, an optimization specification may include rules comprising triggering conditions and actions to be taken to modify document plans.

Alternatively or additionally, the optimization specification may be configured to specify acceptable sequencing patterns of messages returned from the message store or specify the aggregation of the selected messages.

FIG. 3 illustrates an example document plan tree 302 that may be generated by the top-down document planner 212 for input to a microplanner, such as microplanner 132. As is shown in FIG. 3 and as is described herein, the document plan 302 may contain one or more leaf nodes that contain messages, such as messages 306, 308, 310, and 312. The document plan illustrated in FIG. 3 may be created using a schema, such as the schema described above. In such example, the schema specifies queries for an IV Feed message and a Milk Feed message and further specifies that an IV Feed message is followed by a Milk Feed message, if both exist in the message store. The document plan 302 generated using the schema may then be used in the natural language generation system to generate an output text, such as output text 314.

FIG. 4 is an example block diagram of an example computing device for practicing embodiments of an example document planner. In particular, FIG. 4 shows a computing system 400 that may be utilized to implement a natural language generation environment 100 having a natural language generation system 102 including, in some examples, a document planner 130, a microplanner 132 and/or a realizer 134; and/or a user interface 410. One or more general purpose or special purpose computing systems/devices may be used to implement the natural language generation system 102 and/or the user interface 410. In addition, the computing system 400 may comprise one or more distinct computing systems/devices and may span distributed locations. In some example embodiments, the natural language generation system 102 may be configured to operate remotely via the network 450. In other example embodiments, a pre-processing module or other module that requires heavy computational load may be configured to perform that computational load and thus may be on a remote device or server. For example, the realizer 134 may be accessed remotely. Furthermore, each block shown may represent one or more such blocks as appropriate to a specific example embodiment. In some cases one or more of the blocks may be combined with other blocks. Also, the natural language generation system 102 may be implemented in software, hardware, firmware, or in some combination to achieve the capabilities described herein.

In the example embodiment shown, computing system 400 comprises a computer memory ("memory") 401, a display 402, one or more processors 403, input/output devices 404 (e.g., keyboard, mouse, CRT or LCD display, touch screen, gesture sensing device and/or the like), other computer-readable media 405, and communications interface 406. The processor 403 may, for example, be embodied as various means including one or more microprocessors with accompanying digital signal processor(s), one or more processor(s) without an accompanying digital signal processor, one or more coprocessors, one or more multi-core processors, one or more controllers, processing circuitry, one or more computers, various other processing elements including integrated circuits such as, for example, an application-specific integrated circuit (ASIC) or field-programmable gate array (FPGA), or some combination thereof. Accordingly, although illustrated in FIG. 4 as a single processor, in some embodiments the processor 403 comprises a plurality of processors. The plurality of processors may be in operative communication with each other and may be collectively configured to perform one or more functionalities of the example document planner as described herein.

The natural language generation system 102 is shown residing in memory 401. The memory 401 may comprise, for example, transitory and/or non-transitory memory, such as volatile memory, non-volatile memory, or some combination thereof. Although illustrated in FIG. 4 as a single memory, the memory 401 may comprise a plurality of memories. The plurality of memories may be embodied on a single computing device or may be distributed across a plurality of computing devices collectively configured to function as the example document planner. In various example embodiments, the memory 401 may comprise, for example, a hard disk, random access memory, cache memory, flash memory, a compact disc read only memory (CD-ROM), digital versatile disc read only memory (DVD-ROM), an optical disc, circuitry configured to store information, or some combination thereof.

In other embodiments, some portion of the contents, some or all of the components of the natural language generation system 102 may be stored on and/or transmitted over the other computer-readable media 405. The components of the natural language generation system 102 preferably execute on one or more processors 403 and are configured to enable operation of an example document planner, as described herein.

Alternatively or additionally, other code or programs 430 (e.g., an administrative interface, a Web server, and the like) and potentially other data repositories, such as other data sources 440, also reside in the memory 401, and preferably execute on one or more processors 403. Of note, one or more of the components in FIG. 4 may not be present in any specific implementation. For example, some embodiments may not provide other computer readable media 405 or a display 402.

The natural language generation system 102 is further configured to provide functions such as those described with reference to FIG. 1. The natural language generation system 102 may interact with the network 450, via the communications interface 406, with remote data sources 456 (e.g. remote reference data, remote lexicalization rules, remote aggregation data, remote genre parameters and/or the like), third-party content providers 454 and/or client devices 458. The network 450 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX, Bluetooth) that facilitate communication between remotely situated humans and/or devices. In some instance the network 450 may take the form of the internet or may be embodied by a cellular network such as an LTE based network. In this regard, the communications interface 406 may be capable of operating with one or more air interface standards, communication protocols, modulation types, access types, and/or the like. The client devices 458 include desktop computing systems, notebook computers, mobile phones, smart phones, personal digital assistants, tablets and/or the like.

In an example embodiment, components/modules of the natural language generation system 102 are implemented using standard programming techniques. For example, the natural language generation system 102 may be implemented as a "native" executable running on the processor 403, along with one or more static or dynamic libraries. In other embodiments, the natural language generation system 102 may be implemented as instructions processed by a virtual machine that executes as one of the other programs 430. In general, a range of programming languages known in the art may be employed for implementing such example embodiments, including representative implementations of various programming language paradigms, including but not limited to, object-oriented (e.g., Java, C++, C#, Visual Basic.NET, Smalltalk, and the like), functional (e.g., ML, Lisp, Scheme, and the like), procedural (e.g., C, Pascal, Ada, Modula, and the like), scripting (e.g., Perl, Ruby, Python, JavaScript, VBScript, and the like), and declarative (e.g., SQL, Prolog, and the like).

The embodiments described above may also use synchronous or asynchronous client-server computing techniques. Also, the various components may be implemented using more monolithic programming techniques, for example, as an executable running on a single processor computer system, or alternatively decomposed using a variety of structuring techniques, including but not limited to, multiprogramming, multithreading, client-server, or peer-to-peer, running on one or more computer systems each having one or more processors. Some embodiments may execute concurrently and asynchronously, and communicate using message passing techniques. Equivalent synchronous embodiments are also supported. Also, other functions could be implemented and/or performed by each component/module, and in different orders, and by different components/modules, yet still achieve the described functions.

In addition, programming interfaces to the data stored as part of the natural language generation system 102, such as by using one or more application programming interfaces can be made available by mechanisms such as through application programming interfaces (API) (e.g. C, C++, C#, and Java); libraries for accessing files, databases, or other data repositories; through scripting languages such as XML; or through Web servers, FTP servers, or other types of servers providing access to stored data. The message store 110, the domain model 112 and/or the linguistic resources 114 may be implemented as one or more database systems, file systems, or any other technique for storing such information, or any combination of the above, including implementations using distributed computing techniques. Alternatively or additionally, the message store 110, the domain model 112 and/or the linguistic resources 114 may be local data stores but may also be configured to access data from the remote data sources 456.

Different configurations and locations of programs and data are contemplated for use with techniques described herein. A variety of distributed computing techniques are appropriate for implementing the components of the illustrated embodiments in a distributed manner including but not limited to TCP/IP sockets, RPC, RMI, HTTP, Web Services (XML-RPC, JAX-RPC, SOAP, and the like). Other variations are possible. Also, other functionality could be provided by each component/module, or existing functionality could be distributed amongst the components/modules in different ways, yet still achieve the functions described herein.

Furthermore, in some embodiments, some or all of the components of the natural language generation system 102 may be implemented or provided in other manners, such as at least partially in firmware and/or hardware, including, but not limited to one or more ASICs, standard integrated circuits, controllers executing appropriate instructions, and including microcontrollers and/or embedded controllers, FPGAs, complex programmable logic devices ("CPLDs"), and the like. Some or all of the system components and/or data structures may also be stored as contents (e.g., as executable or other machine-readable software instructions or structured data) on a computer-readable medium so as to enable or configure the computer-readable medium and/or one or more associated computing systems or devices to execute or otherwise use or provide the contents to perform at least some of the described techniques. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

FIG. 5 illustrates an example flowchart of the operations performed by an apparatus, such as computing system 400 of FIG. 4, in accordance with example embodiments of the present invention. It will be understood that each block of the flowchart, and combinations of blocks in the flowchart, may be implemented by various means, such as hardware, firmware, one or more processors, circuitry and/or other devices associated with execution of software including one or more computer program instructions. For example, one or more of the procedures described above may be embodied by computer program instructions. In this regard, the computer program instructions which embody the procedures described above may be stored by a memory 401 of an apparatus employing an embodiment of the present invention and executed by a processor 403 in the apparatus. As will be appreciated, any such computer program instructions may be loaded onto a computer or other programmable apparatus (e.g., hardware) to produce a machine, such that the resulting computer or other programmable apparatus provides for implementation of the functions specified in the flowcharts' block(s). These computer program instructions may also be stored in a non-transitory computer-readable storage memory that may direct a computer or other programmable apparatus to function in a particular manner, such that the instructions stored in the computer-readable storage memory produce an article of manufacture, the execution of which implements the function specified in the flowcharts' block(s). The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flowcharts' block(s). As such, the operations of FIG. 5, when executed, convert a computer or processing circuitry into a particular machine configured to perform an example embodiment of the present invention. Accordingly, the operations of FIG. 5 define an algorithm for configuring a computer or processor, to perform an example embodiment. In some cases, a general purpose computer may be provided with an instance of the processor which performs the algorithm of FIG. 5 to transform the general purpose computer into a particular machine configured to perform an example embodiment.

Accordingly, blocks of the flowchart support combinations of means for performing the specified functions and combinations of operations for performing the specified functions. It will also be understood that one or more blocks of the flowcharts, and combinations of blocks in the flowchart, can be implemented by special purpose hardware-based computer systems which perform the specified functions, or combinations of special purpose hardware and computer instructions.

In some example embodiments, certain ones of the operations herein may be modified or further amplified as described below. Moreover, in some embodiments additional optional operations may also be included. It should be appreciated that each of the modifications, optional additions or amplifications described herein may be included with the operations herein either alone or in combination with any others among the features described herein.

FIG. 5 is a flowchart illustrating an example method for generating an optimal document plan tree performed by a document planner according to some example embodiments. As shown in block 502, the document planner 130 may include means, such as the top-down document planner 212, the processor 403, or the like, for accessing a message store, such as message store 110, containing one or more messages. At block 504, the document planner 130 may include means, such as the top-down document planner 212, the processor 403, or the like, for selecting a schema from a schema store, such as schema store 202, based on the one or more messages available in the message store.

At block 506, the document planner 130 may include means, such as the top-down document planner 212, the processor 403, or the like, for beginning operations for generating a document plan. For example, the document planner 130 may begin generation of a document plan using the selected schema and one or more messages from the message store. In some example embodiments, the selected schema may call a sub-schema that is also to be used in generating the first set of document plans. In some embodiments, a schema may also specify pre-defined messages or phrases that may be used in generating a document plan.

At block 508, the document planner 130 may include means, such as the top-down document planner 212, the processor 403, or the like, for selecting one or more messages from the message store based on the schema. The schema may specify queries to be executed against the message store to retrieve message content for use in generating a document plan. In some example embodiments, a schema may further specify alternate queries that may be run against the message store if the initial queries do not return a result including one or more messages. The schema may also specify predefined messages or text for use in generating the document plan.

At block 510, the document planner 130 may include means, such as the top-down document planner 212, the processor 403, or the like, for determining if optimizations is needed based on the messages retrieved from a message store, such as message store 110. For example, if a query returns more than one message, or if the schema does not specify the ordering for multiple messages, the document planner 130 may determine that optimization is needed to generate the desired document plan. If optimization of the returned messages is needed, for example, multiple messages are returned which need to be locally ordered, operation continues to block 512 (510-YES). If optimization of the returned messages is not needed, operation continues to block 516 (510-NO).

At block 512, the document planner 130 may include means, such as the bottom-up plan optimizer 214, the processor 403, or the like, for retrieving an optimization specification, such as from optimization specification store 204, for use in optimizing the retrieved messages to be added to a document plan. An optimization specification may contain rules comprised of triggering conditions and actions to be taken to determine how messages may be added to a document plan during generation of the document plan. For example, the optimization specification may provide rules for locally ordering messages for a section of the document plan.

At block 514, the document planner 130 may include means, such as the bottom-up plan optimizer 214, the processor 403, or the like, for applying the optimization specification rules against the retrieved messages to determine optimal placement of the messages.

At block 516, the document planner 130 may include means, such as the bottom-up plan optimizer 214, the top-down document planner 212, the processor 403, or the like, for adding the messages to the document plan. The document planner 130 may add the retrieved messages to the document plan based on the schema or based on the rules of an optimization specification.

At block 518, the document planner 130 may include means, such as the bottom-up plan optimizer 214, the top-down document planner 212, the processor 403, or the like, for determining whether the generation of a document plan is complete. For example, in some embodiments, the document planner 130 may determine that the schema has been completely instantiated or that all the relevant messages from a message store have been placed in the document plan. If it is determined that the document plan is not complete, for example, there are additional queries specified in the schema, operation returns to block 508 (518-NO). If it is determined that the document plan is complete, operation may continue to block 520 (518-YES).

At block 520, the document planner 130 may include means, such as the bottom-up plan optimizer 214, the processor 403, or the like, for retrieving an optimization specification, such as from optimization specification store 204, for use in optimizing the completed document plan. An optimization specification may contain rules comprised of triggering conditions and actions to be taken to modify the completed document plan to provide an optimal document plan for output, such as to a microplanner. In some example embodiments, the optimization specification may comprise rules for document and/or text size, text fluency, repetition avoidance, determination of paragraph breaks, message ordering, ensuring narrative coherence, maintaining discourse focus, narration development, and/or the like. The optimization specification may also specify sequencing patterns for messages and aggregation of messages.

At block 522, the document planner 130 may include means, such as the bottom-up plan optimizer 214, the processor 403, or the like, for applying the optimization specification rules against the completed document plan to generate an optimal document plan. The optimal document plan may then be provided as input to the microplanner.

FIGS. 6-8 illustrate generating an example document plan using top-down document planning and bottom-up narrative optimization in accordance with some example embodiments of the present invention. In some example embodiments, generating an output document plan comprises a process of first generating a document plan using a top-down document planner and then optimizing the document plan using bottom-up narrative optimization. In some example embodiments, generating an output document plan comprises a process of optimizing the document plan using bottom-up narrative optimization during generation of the document plan using a top-down document planner, i.e., calling the bottom-up optimization operation from within the top-down document planning operation.

In an example embodiment, a sample schema for top-down document planning to generate a weather and temperature text may be represented as:

```
<?xml version="1.0"?>
<!-- Weather Temperature Example -->
<document xmlns:xsi=http://www.w3.org/2001/XMLSchema-instance
xsi:noNamespaceSchemaLocation="docplanner-schema.xsd">
<template id="weatherTemperature" type="root">
  <section id="Summary">
    <paragraph>
      <message-single-query>
        <messagestore-class>WEATHER_EVENT</messagestore-
          class>
        <order-by>
          <order-by-property name="START_TIME"
            order="ascending" />
        </order-by>
      </message-single-query>
      <message-single-query>
        <messagestore-
          class>TEMPERATURE_EVENT</messagestore-class>
        <order-by>
          <order-by-property
            name="TEMPERATURE_VALUE"
            order="ascending" />
        </order-by>
      </message-single-query>
    </paragraph>
  </section>
</template>
</document>
```

Such a schema orders the temperature information after other weather information, capturing the global order of the text, but fails to specify how to order the multiple weather messages. In such situations, the schema may underspecify the global structure and ordering of messages for a text.

In some embodiments the document planner 130 may first call the top-down document planner 212 to select a schema to construct a document plan. When certain conditions are fulfilled, the document planner 130 may then call the bottom-up plan optimizer 214 to provide document plan optimization, such as calling optimization functions such as orderMessages( ) or applyDomainRules( ) to locally order multiple messages returned by a query.

To generate the document plan illustrated in FIG. 8, in an example embodiment, the document planner 130 may access a message store containing messages including:
1. FROST_EVENT
2. PATCHY_FOG_EVENT
3. FREEZING_FOG_EVENT
4. CLOUDY_EVENT
5. FRESHENING_BREEZE_EVENT
6. LIFTING_FOG_EVENT
7. MIN_TEMPERATURE_EVENT
8. MAX_TEMPERATURE_EVENT
9. POLLEN_COUNT_EVENT.

FIG. 6 illustrates the temporal order of the events represented by these messages. As illustrated, message 2 (patchy fog event) and message 3 (freezing fog event) temporally overlap message 1 (frost event). Additionally, message 5 (freshening breeze event) and message 6 (lifting fog event) temporally overlap message 4 (cloudy event).

The top-down document planner 212 may select the Weather+Temperature schema to generate the document plan. As shown in FIG. 7a, the top-down document planner 212 may first create the 'root' docPlan Node, then create a 'section' docPlan node and add it to root as a child node, and then create a 'paragraph' docPlan node and add it to section as a child node. The top-down document planner 212 may execute Message-single-query for WEATHER_EVENT from the schema returning messages 1 through 6 (as listed above) from the message store, with the schema specifying a temporal order for these six messages, as illustrated in FIG. 6.

Because the query returned multiple messages and because there may be an opportunity to further optimize the ordering of these messages, the document planner 130 may call the bottom-up plan optimizer 214 to optimize the document plan being generated. The bottom-up plan optimizer 214 may call an orderMessages( ) function and create a docPlan node to be set as the root of the subtree to be created with the messages returned from the query, as illustrated in FIG. 7b. The orderMessages( ) function may receive the six WEATHER_EVENT messages and the subtree docPlan node. The bottom-up plan optimizer 214 may then execute rules to determine a domain specific subtree construction method. In the example embodiment, the bottom-up plan optimizer 214 may call a createTemporalStructure( ) function to create the subtree with the six messages.

The createTemporalStructure( ) function may receive the temporally ordered list of six messages and the subtree root docPlan node. The createTemporalStructure( ) function creates a docPlan node with the first (temporally ordered) message (#1 Frost_Event) and adds it to the subtree root docPlan node as a child, as illustrated in FIG. 7c. The createTemporalStructure( ) function checks through the rest of the message list to determine if any messages temporally overlap the first message (#1). The createTemporalStructure( ) function finds messages #2 and #3, since, as shown in FIG. 6, messages #2 and #3 temporally overlap with message #1. The createTemporalStructure( ) function creates docPlan nodes for messages #2 and #3 and adds them as children to the docPlan node with message #1, as illustrated in FIG. 7d. The createTemporalStructure( ) function creates a docPlan node with the next message (#4 Cloudy_Event) and adds it to the subtree root docPlan node. The createTemporalStructure( ) function checks through the rest of the message list to determine if any messages temporally overlap the fourth message and finds messages #5 and #6, since, as shown in FIG. 6, messages #5 and #6 temporally overlap with message #4. The createTemporalStructure( ) function creates docPlan nodes for messages #5 and #6 and adds them as children to the docPlan node with message #4, as illustrated in FIG. 7e.

The bottom-up plan optimizer 214 then adds the subtree received from OrderMessages( ) to the main document plan by merging the subtree root docPlan node with the paragraph docPlan node, as illustrated in FIG. 7f.

The top-down document planner 212 then executes Message-single-query for TEMPERATURE_EVENT which returns messages #7 and #8 from the message store, with the schema specifying how to order these messages. Because the query returned multiple messages, the bottom-up optimizer might be called to further optimize the sub-plan. In this example case, the bottom-up optimizer would not find any further optimizations, The top-down document planner 212 creates docPlan nodes for each of messages #7 and #8 and adds them as children to the paragraph docPlan node, as illustrated in FIG. 7g. The top-down document planner 212 may then determine that the document plan is complete as there are no more messages or queries to be executed in the schema (note that the schema did not select the POLLEN_COUNT_EVENT from the message store and thus that message is never used in the output document plan). In some embodiments, upon completion of the top-down document planning, the document planner 130 may call the bottom-up plan optimizer 214 to call further functions to optimize the document plan, such as a removeRepeats( ) function that removes repeating messages, for example. The document planner 130 may then output the completed document plan, as illustrated in FIG. 8. FIG. 8 illustrates an exemplary document plan generated using top-down planning and bottom-up optimization which may then be output from document planner 130, such as to microplanner 132.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

That which is claimed:

1. A computer-implemented method for generating an output text by transforming received raw input data into a format that can be linguistically expressed in the output text comprising:
    selecting, using a processor, a schema from a schema store, wherein the schema is selected based on one or more messages in a message store, each of the one or more messages being a language independent data structure, each message corresponding to and selected in response to an existence of at least one fact about the received raw input data, the received raw input data expressed in a non-linguistic format;
    generating, using the processor, a document plan that is instantiated with the one or more messages, wherein the document plan is instantiated according to the schema that comprises a query set, at least one query in the query set configured for selecting any number of the one or more messages in the message store;
    altering, using the processor, the document plan according to an optimization specification, wherein the optimization specification comprises a set of one or more rules, the rules comprising at least one rule for arranging the one or more messages of the document plan based on an optimization function; and
    generating, using the processor, an output text for display on a user interface based on the altered document plan, the output text being a linguistic representation of the raw input data.

2. A method according to claim 1, wherein generating the document plan further comprises the selected schema selecting, using the processor, a second schema to also be used in the generating of the document plan.

3. A method according to claim 1, wherein the schema further comprises one or more of pre-defined text and queries to be executed against the message store for use in generating the document plan.

4. A method according to claim 3, wherein an alternate query may be specified if an initial query executed against the message store does not return a result including one or more messages.

5. A method according to claim 1, wherein the document plan further comprises nodes having parameters specifying one or more of document structure, rhetorical structure, message ordering, document plan optimization, and microplanner parameters.

6. A method according to claim 1, wherein the document plan further comprises nodes having microplanner parameters.

7. A method according to claim 1, wherein the optimization specification further comprises rules for at least one or more of text size, text fluency, avoiding repetition, determining paragraph breaks, ordering messages, ensuring narrative coherence, maintaining discourse focus, and narration development.

8. A method according to claim 7, wherein the optimization specification rules further comprise triggering conditions defined over at least one or more of message properties, message types, and relationships of messages.

9. A method according to claim 1, wherein the optimization specification further specifies one or more of sequencing patterns of messages and aggregation of messages.

10. A method according to claim 1, wherein the one or more rules are configured for comparing a value for at least one message property of the one or more messages in the message store to arrange the one or more messages for maintaining discourse focus.

11. An apparatus that is configured to generate an output text by transforming received raw input data into a format that can be linguistically expressed in the output text, the apparatus comprising:
    at least one processor; and
    at least one memory including computer program code, the at least one memory and the computer program code configured to, with the at least one processor, cause the apparatus to at least:
    select, using the at least one processor, a schema from a schema store, wherein the schema is selected based on one or more messages in a message store, each of the one or more messages being a language independent data structure, each message corresponding to and selected in response to an existence of at least one fact about the received raw input data, the received raw input data expressed in a non-linguistic format;
    generate, using the at least one processor, a document plan that is instantiated with the one or more messages, wherein the document plan is instantiated according to the schema that comprises a query set, at least one query in the query set configured for selecting any number of the one or more messages in the message store;
    alter, using the at least one processor, the document plan in accordance with an optimization specification, wherein the optimization specification comprises a set of one or more rules, the rules comprising at least one rule for arranging the one or more messages of the document plan based on an optimization function; and
    generate, using the at least one processor, an output text for display on a user interface based on the altered document plan, the output text being a linguistic representation of the raw input data.

12. An apparatus according to claim 11, wherein generating the document plan further comprises the selected schema selecting a second schema to also be used in the generating of the document plan.

13. An apparatus according to claim 11, wherein the schema further comprises one or more of pre-defined text and queries to be executed against the message store for use in generating the document plan.

14. An apparatus according to claim 13, wherein an alternate query may be specified if an initial query executed against the message store does not return a result including one or more messages.

15. An apparatus according to claim 11, wherein the document plan further comprises nodes having parameters specifying one or more of document structure, rhetorical structure, message ordering, document plan optimization, and microplanner parameters.

16. An apparatus according to claim 11, wherein the optimization specification comprises rules for at least one or more of text size, text fluency, avoiding repetition, determining paragraph breaks, ordering messages, ensuring narrative coherence, maintaining discourse focus, and narration development.

17. An apparatus according to claim 16, wherein the optimization specification rules further comprise triggering conditions defined over at least one or more of message properties, message types, and relationships of messages.

18. An apparatus according to claim 11, wherein the optimization specification specifies one or more of sequencing patterns of messages and aggregation of messages.

19. An apparatus according to claim 11, wherein the one or more rules are configured to compare a value for at least one message property of the one or more messages in the message store to arrange the one or more messages for maintaining discourse focus.

20. A computer program product that is configured to generate an output text by transforming received raw input data into a format that can be linguistically expressed in the output text, the computer program product comprising:

at least one computer readable non-transitory memory medium having program code instructions stored thereon, the program code instructions which when executed by an apparatus having at least one processor cause the apparatus at least to:

select, using the at least one processor, a schema from a schema store, wherein the schema is selected based on one or more messages in a message store, each of the one or more messages being a language independent data structure, each message corresponding to and selected in response to an existence of at least one fact about the received raw input data, the received raw input data expressed in a non-linguistic format;

generate, using the at least one processor, a document plan that is instantiated with the one or more messages, wherein the document plan is instantiated according to the schema that comprises a query set, at least one query in the query set configured for selecting any number of the one or more messages in the message store;

alter, using the at least one processor, the document plan in accordance with an optimization specification, wherein the optimization specification comprises a set of one or more rules, the rules comprising at least one rule for arranging the one or more messages of the document plan based on an optimization function; and generate, using the at least one processor, an output text for display on a user interface based on the altered document plan the output text being a linguistic representation of the raw input data.

\* \* \* \* \*